(12) United States Patent
Guan et al.

(10) Patent No.: US 12,555,208 B2
(45) Date of Patent: *Feb. 17, 2026

(54) SYSTEM AND METHOD TO FUSE MULTIPLE SOURCES OF OPTICAL DATA TO GENERATE A HIGH-RESOLUTION, FREQUENT AND CLOUD-/GAP-FREE SURFACE REFLECTANCE PRODUCT

(71) Applicant: The Board of Trustees of the University of Illinois, Urbana, IL (US)

(72) Inventors: Kaiyu Guan, Urbana, IL (US); Jian Peng, Champaign, IL (US); Yunan Luo, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/219,373

(22) Filed: Jul. 7, 2023

(65) Prior Publication Data
US 2023/0368342 A1    Nov. 16, 2023

Related U.S. Application Data

(63) Continuation of application No. 16/968,364, filed as application No. PCT/US2019/017304 on Feb. 8, 2019, now Pat. No. 11,715,181.
(Continued)

(51) Int. Cl.
*G06T 5/77* (2024.01)
*G06T 5/50* (2006.01)
(Continued)

(52) U.S. Cl.
CPC ............... *G06T 5/77* (2024.01); *G06T 5/50* (2013.01); *G06T 7/10* (2017.01); *G06V 10/26* (2022.01);
(Continued)

(58) Field of Classification Search
CPC . G06T 2207/10032–10044; G06T 7/10; G06T 5/77; G06T 5/00; G06T 5/50;
(Continued)

(56) References Cited

U.S. PATENT DOCUMENTS 4,683,496 A * 7/1987 Tom ...................... G06T 3/4061
348/625
6,711,293 B1    3/2004 Lowe
(Continued)

FOREIGN PATENT DOCUMENTS

CN    104915674 B    12/2018

OTHER PUBLICATIONS

Gao et al Toward mapping crop progress at field scales through fusion of Landsat and MODIS imagery; Remote Sensing of Environment vol. 188, Jan. 2017, pp. 9-25 (Year: 2017).*
(Continued)

*Primary Examiner* — Sean T Motsinger
(74) *Attorney, Agent, or Firm* — McKee, Voorhees & Sease, PLC

(57) ABSTRACT

Aspects of the subject disclosure may include, for example, performing, by a processing system, image fusion using two or more groups of images to generate predicted images, wherein each group of the two or more groups has one of a different resolution, a different frequency temporal pattern or a combination thereof than another of the two or more groups. Gap filling can be performed by the processing system to correct images of the two or more groups. Additional embodiments are disclosed.

10 Claims, 17 Drawing Sheets

Related U.S. Application Data

(60) Provisional application No. 62/628,769, filed on Feb. 9, 2018.

(51) Int. Cl.
| | |
|---|---|
| *G06T 7/10* | (2017.01) |
| *G06V 10/26* | (2022.01) |
| *G06V 10/80* | (2022.01) |
| *G06V 20/13* | (2022.01) |

(52) U.S. Cl.
CPC .......... *G06V 10/803* (2022.01); *G06V 20/13* (2022.01); *G06T 2207/10032* (2013.01); *G06T 2207/20016* (2013.01); *G06T 2207/20221* (2013.01); *G06T 2207/20224* (2013.01); *G06T 2207/30188* (2013.01)

(58) Field of Classification Search
CPC .......... G06T 2207/20016; G06T 2207/20221; G06V 10/803; G06V 10/26; G06V 20/13
See application file for complete search history.

(56) References Cited

U.S. PATENT DOCUMENTS

| | | | |
|---|---|---|---|
| 7,079,705 | B2 | 7/2006 | Zhang et al. |
| 7,340,099 | B2 | 3/2008 | Zhang |
| 8,320,712 | B2 | 11/2012 | Choi et al. |
| 9,875,430 | B1* | 1/2018 | Keisler ............ G06T 5/77 |
| 11,715,181 | B2* | 8/2023 | Guan ............... H04N 1/3871 |
| | | | 382/100 |
| 2010/0046843 | A1 | 2/2010 | Ma et al. |
| 2010/0149381 | A1 | 6/2010 | Motomura et al. |
| 2012/0288159 | A1 | 11/2012 | Asner |
| 2013/0188865 | A1 | 7/2013 | Saha et al. |
| 2013/0250104 | A1* | 9/2013 | Williams ........... G06T 3/4061 |
| | | | 348/E7.085 |
| 2014/0201667 | A1* | 7/2014 | Schoeberl ......... G06F 3/04842 |
| | | | 715/771 |
| 2016/0300336 | A1 | 10/2016 | Pacifici |
| 2017/0032185 | A1 | 2/2017 | Zhang et al. |
| 2017/0323426 | A1* | 11/2017 | Johannesson ........ G06T 5/50 |
| 2019/0114744 | A1* | 4/2019 | Albrecht ............ G06T 3/4053 |
| 2020/0034949 | A1* | 1/2020 | Van Niekerk ........ G06T 7/75 |
| 2020/0065946 | A1* | 2/2020 | Nagare .............. G06T 5/73 |
| 2021/0118097 | A1* | 4/2021 | Guan ................ G06V 10/26 |
| 2022/0215659 | A1* | 7/2022 | Melaas ............. G06V 20/188 |

OTHER PUBLICATIONS

Claverie et al Harmonized Landsat-8 Sentinel-2 (HLS) Product User's Guide http://hls.gsfc.nasa.gov/ Feb. 28, 2016 (Year: 2016).*

Gao et al "Toward Mapping crop progress at field scales though fusion of Landsat and Modis imagery" Remote Sensing of Environment vol. 188 Jan. 2017 (Year: 2017).*

Zhu et al A new geostatistical approach for filling gaps in Landsat ETM+ SLC-off images; Remote Sensing of Environment vol. 124 Sep. 2012 pp. 49-60 (Year: 2012).*

Claverie et al Harmonized Landsat-8 Sentinal-2 Product User's Guides http://hls.gsfc.nasa.gov/ Feb. 28, 2016 (Year: 2016).*

Maxwell et al., "A multi-scale segmentation approach to filling gaps in Landsat ETM+ SLC-off images", International Journal of Remote Sensing, vol. 28, No. 23, pp. 5339-5356, Dec. 10, 2007.

Herbei et al., "Classification of Land and Crops Based on Satellite Images Landsat 8: Case Study SD Timisoara", Bulletin of University of Agricultural Sciences and Veterinary Medicine Cluj-Napoca Agriculture, Vo. 73, Issue 1, pp. 29-34, 2016.

Arvidson, Terry et al., "LANDSAT-7 Long-Term Acquisition Plan: Development and Validation", Photogrammetric Engineering & Remote Sensing, Oct. 2006, pp. 1137-1146 2006.

Bessho, Kotaro et al., "An Introduction to Himawari-8/9—Japan's New-Generation Geostationary Meteorological Satellittes", Journal of the Meteorological Society of Japan, vol. 94, No. 2, 2016, pp. 151-183 2016.

Cammalleri, C. et al., "Mapping Daily Evapotranspiration at Field Scales Over Rainfed and Irrigated Agricultural Areas Using Remote Sensing Data Fusion", Elsevier; Agricultural and Forest Meteorology 186, Nov. 2, 2013, pp. 1-11 2013.

Cao, Changyong et al., "Suomi NPP Viirs Sensor Data Record Verification, Validation, and Long-Term Perfromance Monitoring", Journal of Geophysical Research: Atmospheres, vol. 118, Oct. 17, 2013, pp. 11,664-11,678 2013.

Chen, Jin et al., "A Simple and Effective Method for Filling Gaps in Landsat ETM+ SLC-Off Images", Elsevier; Remote Sensing of Environment 115, Jan. 15, 2011, pp. 1053-1064 2011.

Claverie, Martin et al., "Evaluation of the Landsat-5 TM and Landsat-7 ETM + Surface Reflectance Products", Elsevier; Remote Sensing of Environment 169, Sep. 28, 2015, p. 390-403 2015.

Claverie, Martin et al., "The Harmonized Landsat and Sentinel-2 Surface Reflectance Data Set", Elsevier; Remote Sensing of Environment 219, Oct. 14, 2018, pp. 145-161 2018.

Denis, Gil et al., "Towards Disruptions in Earth Observation? New Earth Observation Systems and Markets Evolution: Possible Scenarios and Impacts", Elsevier; Acta Astronautica 137, May 4, 2017, pp. 415-433 2017.

Dierckx, Wouter et al., "Proba-V Mission for Global Vegeration Monitoring: Standard Products and Image Quality", International Journal of Remote Sensing, vol. 35, No. 7, Mar. 27, 2014, 27 pages 2014.

Drusch, M. et al., "Sentinel-2: ESA's Optical High-Resolution Mission for GMES Operational Services", Elsevier; Remote Sensing of Environment 120, Feb. 29, 2012, pp. 25-36 2012.

Flood, Neil, "Continuity of Reflectance Data Between Landsat-7 ETM+ and Landsat-8 Oli, for Both Top-of-Atmosphere and Surface Reflectance: A Study in the Australian Landscape", Remote Sensing, www.mdpi.com/journal/remotesensing, Aug. 26, 2014, pp. 7952-7970 2014.

Galleguillos, Mauricio et al., "Prediction of Alien Species Richness in Two Forest Watershed of South-Central Chile: A Remote Sensing Synergistic Approach", Universidad Mayor, https://www.umayor.cl/descargables/ForestSTAT.pdf#page=184>, Nov. 18, 2016, pp. 184-187 2016.

Gao, Feng et al., "Fusing Landsat and Modis Data for Vegetation Monitoring", Data Fusion in Remote Sensing, IEEE Geoscience and Remote Sensing Magazine, Oct. 5, 2015, 2015.

Gao, Feng et al., "On the Blending of the Landsat and Modis Surface Reflectance: Predicting Daily Landsat Surface Reflectance", IEEE Transactions on Geoscience and Remote Sensing, vol. 44, No. 8, Jan. 9, 2006, pp. 2207-2218 2006.

Gao, Feng et al., "Toward Mapping Crop Progress at Field Scales Through Fusion of Landsat and Modis Imagery", Elsevier; Remote Sensing of Environment, Nov. 10, 2016, pp. 9-25 2016.

Gaulton, Rachel et al., "Characterizing Stand-Replacing Disturbance in Western Alberta Grizzly Bear Habbit, Using a Satellite-Derived High Temporal and Spatial Resolution Change Sequence", Elsevier; Forest Ecology and Management 261, Apr. 15, 2010, pp. 865-877 2010.

Hansen, M. C. et al., "High-Resolution Global Maps of 21st-Century Forest Cover Change", Science; vol. 342, www.sciencemag.org, Nov. 15, 2013, 5 pages 2013.

Henson, R., "Satellite Observations to Benefit Science and Society—Recommended Missions for the Next Decade", National research Council of the National Academics, Earth Science and Applications from Space, 2008, 41 pages 2008.

Hilker, Thomas et al., "A New Data Fusion Model for High Spatial-And Temporal-Resolution Mapping of Forest Disturbance Based on Landsat and Modis", Elsevier; Remote Sensing of Environment 113, Mar. 14, 2009, pp. 1613-1624 2009.

Hossain, Faisal et al., "Data for All: Using Satellite Observations for Social Good", EOS Science News by AGU, Oct. 14, 2015, 14 pages 2015.

Imhoff, Marc L. et al., "Remote Sensing of the Urban Heat Island Effect Across Biomes in the Continental USA", Elsevier; Remote Sensing Environment 114, Oct. 9, 2009, pp. 504-513 2009.

(56) References Cited

OTHER PUBLICATIONS

Jean, Neal et al., "Combining Satellite Imagery and Machine Learning To Predict Poverty", Science, vol. 353 Issue 6301, Aug. 19, 2016, pp. 790-795 2016.
Ju, Junchang et al., "The Availability of Cloud-Free Landast ETM+ Data Over the Conterminous United States and Globally", Elsevier; Remote Sensing of Environment 112, Aug. 4, 2007, pp. 1196-1211 2007.
Li, Peng et al., "Cross-Comparison of Vegetation Indices Derived From Landsat-7 Enhanced Thematic Mapper Plus (ETM+) and Landsat-8 Operational Land Imager (OLI) Sensors", Remote Sensing, Institute of Geographic Sciences and Natural Resources Research, Chinese Academy of Sciences, Dec. 27, 2013, 20 pages 2013.
Lloyd, Stuart P., "Least Squares Quantization in PCM", IEEE Transactions on Information Theory, vol. IT-28, No. 2, Mar. 1982, pp. 129-137 1982.
Louis, Jerome et al., "Sentinel-2 Sen2cor: L2A Processor for Users", Proc. Living Planet Symposium 2016, 2016, 8 pages 2016.
Loveland, Thomas R. et al., "Landsat: Building a Strong Future", Elsevier; Remote Sensing of Environment 122, Feb. 15, 2012, pp. 22-29 2012.
Lowe, David G., "Object Recognition From Local Scale-Invariant Features", Computer Science Department, University of British Columbia, 1999, 8 pages 1999.
Luo, Yunan et al., "Stair: A Generic and Fully-Automated Method to Fuse Multiple Sources of Optical Satellite Data to Generate a High-Resolution, Daily and Cloud- /Gap-Free Surface Reflectance Product", Elsevier; Remote Sensing of Environment, May 26, 2018, 13 pages 2018.
Masek, Jeffrey G., "A Landsat Surface Reflectance Dataset for North America, 1990-2000", IEEE Geoscience and Remote Sensing Letters, vol. 3, No. 1, Jan. 2006, pp. 68-72 2006.
Mulla, David J. et al., "Twenty Five Years of Remote Sensing in Precision Agriculture: Key Advances and Remaining Knowledge Gaps", Elsevier; Biosystems Engineering 114, Sep. 13, 2012, pp. 358-371 2012.
Ojeda, Silvia et al., "A New Image Segmentation Algorithm With Applications to Image Inpainting", Elsevier; Computational Statistics and Data Analysis, Apr. 8, 2010, 12 pages 2010.
Otsu, Nobuyuki, "A Threshold Selection Method From Gray-Level Histograms", IEEE Transactions on Systems, Man, and Cybernetics, vol. SMC-9, No. 1, Jan. 1979, pp. 62-66 1979.
Patent Cooperation Treaty, "International Preliminary Report on Patentability mailed Aug. 20, 2020", PCT Application No. PCT/US19/17304, 8 pages 2020.
Patent Cooperation Treaty, "International Search Report and Written Opinion mailed Jun. 11, 2019", PCT Application No. PCT/US19/17304, 12 p. 2019.
Portmann, Felix T. et al., "MIRCA2000—Global Monthly Irrigated and Rainfed Crop Areas Around the Year 2000: A New High-Resolution Data Set for Agricultural and Hydrological Modeling", Global Biogeochemical Cycles, vol. 24, Mar. 13, 2010, 24 pages 2010.
Roy, D. P. et al., "A General Method To Normalize Landsat Reflectance Data to Nadir Brdf Adjusted Reflectance", Elsevier, Remote Sensing of Environment 176, Feb. 13, 2016, pp. 255-271 2016.
Roy, D. P. et al., "Characterization of Landsat-? to Landsat-8 Reflective Wavelength and Normalized Difference Vegetation Index Continuity", Elsevier, Remote Sensing of Environment 185, Jan. 12, 2016, pp. 57-70 2016.
Roy, D.P. et al., "Landsat-8: Science and Product Vision for Terrestrial Global Change Research", Elsevier, Remote Sensing of Environment 145, Mar. 4, 2014, pp. 154-172 2014.
Roy, David P. et al., "Multi-Temporal Modis-Landsat Data Fusion for Relative Radiometric Normalization Gap Filling, and Prediction of Landsat Data", Elsevier, https://globalmonitoring.sdstate.edu/sites/default/files/royju_modis_land sat.pdf, Mar. 8, 2008, 19 pages 2008.
Rulloni, Valeria et al., "Large Gaps Imputation in Remote Sensed Imagery of the Environment", Computional Statistics & Data Analysis, vol. 56, Issue 8, 2010, pp. 2388-2403 2010.
Schaff, Crystal B. et al., "First Operational Brdf, Albedo Nadir Reflectance Products From Modis", Elsevier, Remote Sensing of Environment 83, Feb. 12, 2002, pp. 135-148 2002.
Schmetz, Johannes et al., "An Introduction to Meteosat Second Generation (MSG)", American Meteorological Society, Jul. 2002, pp. 977-992 2002.
Schmit, Timothy J. et al., "Introducing the Next-Generation Advanced Baseline Imager on Goes-R", American Meteorological Society, Aug. 2005, pp. 1079-1096 2005.
Stone, Brian J. et al., "Urban Form and Thermal Efficiency", How the Design of Cities Influences the Urban Heat Island Effect, Journal of the American Planning Association, vol. 67, No. 2, 2001, pp. 186-198 2001.
Strahler, A. H. et al., "MODIS BRDF / Albedo Product: Algorithm Theoretical Basis Document Version 5.0", MODIS Product ID: MOD43, Version 5.0, Apr. 1999, 53 pages 1999.
Tibshirani, Robert et al., "Estimating the Number of Clusters in a Data Set Via the Gap Statistic", Stanford University, USA, J.R. Statist. Soc. B (2001), Nov. 2000, pp. 411-423 2000.
Wang, Zhuosen et al., "Evaluation of Modis Albedo Product (MCD43A) Over Grassland, Agriculture and Forest Surface Types During Dormant and Snow-Covered Periods", Elsevier, Remote Sensing of Environment 140, Sep. 19, 2013, pp. 60-77 2013.
Yan, Lin et al., "An Automated Approach for Sub-Pixel Registration of Landsat-8 Operational Land Imager (OLI) and Sentinel-2 Multi Spectral Instrument (MSI) Imagery", Remote Sensing, Geospatial Sciences Center of Excellence, South Dakota State University, Jun. 21, 2016, 23 pages 2016.
Zhu, Xiaolin et al., "A New Geostatistical Approach for Fillin Gaps in Landsat ETM+ SLC-Off Images", Remote Sensing of Environment, May 12, 2012, pp. 49-60 2012.
Zhu, Xiaolin et al., "An Ehanced Spatial and Temporal Adaptive Reflectance Fusion Model for Complex Heterogeneous Regions", Elsevier, Remote Sensing Environment 114, May 29, 2010, pp. 2610-2623 2010.
Zhu, Zhe et al., "Object-Based Cloud and Cloud Shadow Detection in Landsat Imagery", Center for Remote Sensing, Department of Geography and Environment, Boston University, 2012, 37 pages 2012.

* cited by examiner

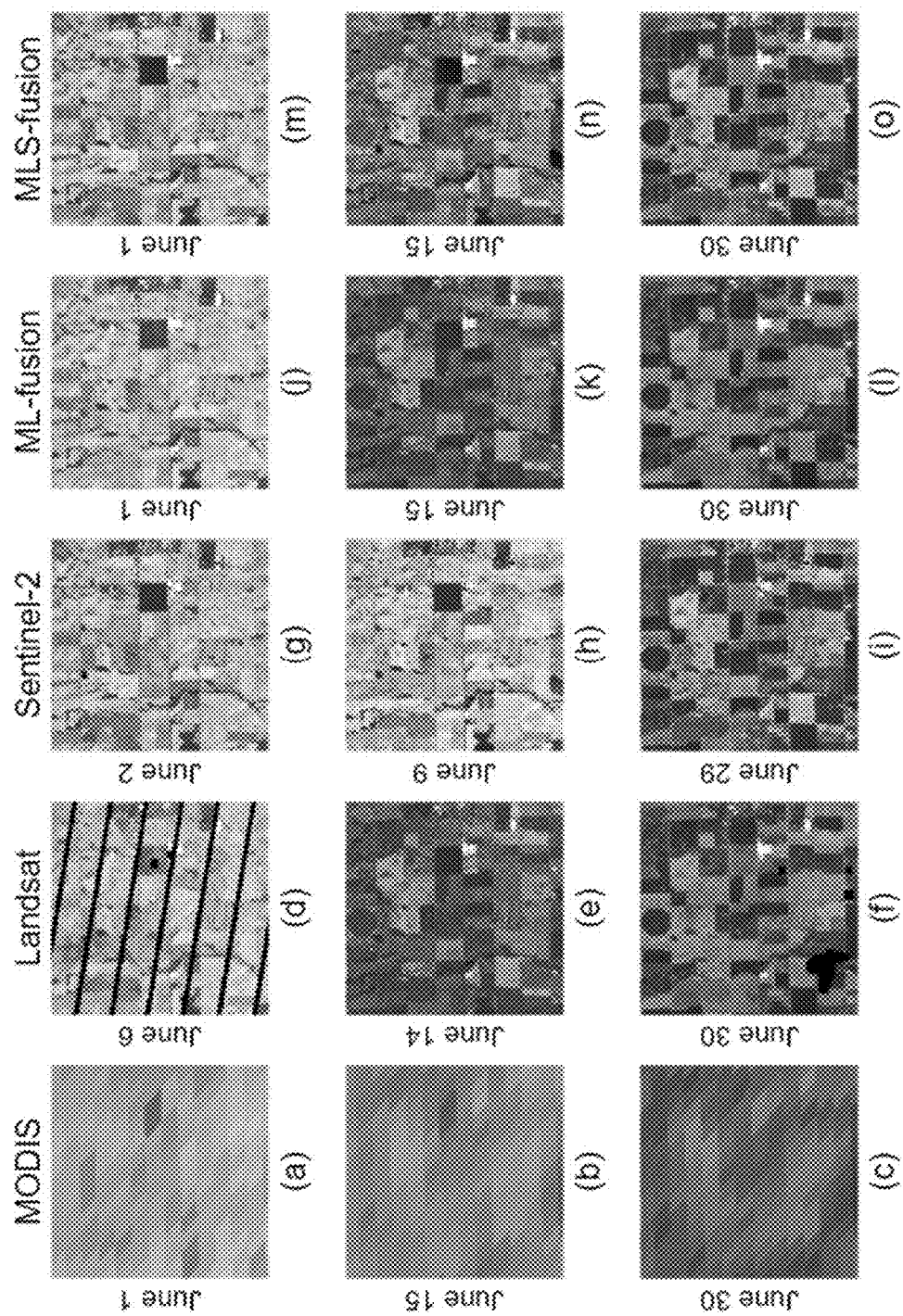
FIGs. 13a-o

```
┌─────────────────────────────────────────────────────────────────┐
│ Partitioning, by a processing system including a processor, an │
│ image into a group of segments, wherein each segment of the     │
│ group of segments includes pixels corresponding to one type of  │
│ homogeneous pixels    1402                                      │
└─────────────────────────────────────────────────────────────────┘
                                  │
                                  ▼
┌─────────────────────────────────────────────────────────────────┐
│ Determining, by the processing system, a relative difference    │
│ for each segment of the group of segments           1404        │
└─────────────────────────────────────────────────────────────────┘
                                  │
                                  ▼
┌─────────────────────────────────────────────────────────────────┐
│ Adaptively correcting, by the processing system, pixels in      │
│ gaps, wherein the pixels are classified to each segment,        │
│ wherein the correcting is according to the relative difference  │
│ for each segment, and wherein the correcting results in an      │
│ adaptively corrected image    1406                              │
└─────────────────────────────────────────────────────────────────┘
```

SYSTEM AND METHOD TO FUSE MULTIPLE SOURCES OF OPTICAL DATA TO GENERATE A HIGH-RESOLUTION, FREQUENT AND CLOUD-/GAP-FREE SURFACE REFLECTANCE PRODUCT

CROSS REFERENCE TO RELATED APPLICATIONS

This is a Continuation application of U.S. Ser. No. 16/968,364, filed Aug. 7, 2020, which is a U.S. National Stage of International Application No. PCT/US2019/017304, filed on Feb. 8, 2019, which claims priority under 35 U.S.C. § 119 to provisional patent application U.S. Ser. No. 62/628,769, filed Feb. 9, 2018. The provisional patent application is herein incorporated by reference in its entirety, including without limitation, the specification, claims, and abstract, as well as any figures, tables, appendices, or drawings thereof.

STATEMENT REGARDING FEDERALLY SPONSORED RESEARCH OR DEVELOPMENT

This invention was made with government support under NNX16AI56G awarded by the National Aeronautics and Space Administration and under OCI-0725070 and ACI-1238993 awarded by the National Science Foundation. The government has certain rights in this invention.

TECHNICAL FIELD

The subject disclosure relates generally to image analysis and processing, and more specifically to a system and method to fuse multiple sources of optical data to generate a high-resolution, frequent and cloud-free/gap-free surface reflectance product. In one specific example, the surface reflectance product is cloud-free. In another specific example, the surface reflectance product is gap-free. In another specific example, the surface reflectance product is cloud-free and gap-free.

BACKGROUND

High spatial resolution and high revisiting frequency has not been achieved simultaneously at one satellite sensor. For example, coarse-resolution satellite data have daily (e.g., MODIS and VIIRS) or even sub-hourly sampling frequency (e.g., GOES-R), but their spatial resolution is low (e.g., 500 m-a few km). High-/medium-resolution satellite data have much finer spatial granularity (e.g., Landsat: 30 m, Sentinel-2: 10 m), but the sampling frequency is low (multiple days to weeks). On the other hand, societal applications have a pressing need for more satellite data that have high resolutions in both space and time (Hossain, 2015; Henson, 2008; Denis et al., 2017).

High-/medium-resolution satellite data (e.g., Sentinel-2 and commercial satellites) still exhibit data gaps and filling of such data gaps remains challenging.

Spatial and Temporal Adaptive Reflectance Fusion Model (STARFM) developed by Gao et al. (Gao et al., 2006) and its variates (e.g., ESTARFM) (Zhu et al., 2010) have generated Landsat-MODIS fusion products for local or regional applications in crop monitoring (Gao et al., 2017), ecosystem disturbance detection (Hilker et al., 2009; Gaulton et al., 2011), field-level disaggregation of evapotranspiration (Cammalleri et al., 2014). However, there exists large space for improvements for more advanced and generic fusion approaches. STARFM and its successor ESTARFM share the same fusion paradigm (Gao et al., 2015). Taking as input the MODIS image of the target date and one or two clear-day Landsat-MODIS image pairs of other matching dates (preferably dozens of days apart from the target date), STARFM (or ESTARFM) predicts a fine-resolution image of the target date using a weighted neighborhood voting process. This paradigm mainly relies upon the availability of clear Landsat and MODIS images on matching dates, which, however, is not often the case in practice.

Satellite images, especially Landsat, often contain missing values due to cloud contamination or un-scanned pixels (e.g., failure of Scan Line Corrector (SLC-off) in Landsat 7), which makes it difficult to search Landsat-MODIS image pairs on match dates that are temporarily close to the target date. This fact greatly limits the applicability of methods that share the same spirit as STARFM. For example, when a single pixel was cloud contaminated in both of the two input Landsat images, STARFM would fail to predict the value of this pixel in the fine-resolution output image. This may require continuing searching for the closest possible Landsat-MODIS image pair of a matching date, even if it is months away from the target date. This seeks the data availability at the cost of prediction accuracy, as image pairs that are months apart from the target date would provide less accurate information for the data fusion process.

BRIEF DESCRIPTION OF THE DRAWINGS

Reference will now be made to the accompanying drawings, which are not necessarily drawn to scale, and wherein:

FIG. 3a shows original SLC-off Landsat 7 image at the red band with un-scanned gaps. FIG. 3b shows imputation using the linear interpolation. FIG. 3c shows imputation using the global-average correction. FIG. 3d shows imputation using the adaptive-average correction.

FIG. 8a illustrates two regions with different land covers in a subarea (North of Champaign County, IL), Area 1 and Area 2 (highlighted by blue and red boxes, respectively), were selected to compute their NDVI time series. FIG. 8b illustrates NDVI values derived from Landsat data and from fusion data from an embodiment, and fitted curves for Area 1 and Area 2. Fitted curves were built using the Savitzky Golay algorithm.

FIGS. 13a-o depict examples of STAIR 2.0 fusion results according to an embodiment.

FIG. 14 depicts an illustrative embodiment of a method in accordance with various aspects described herein.

DETAILED DESCRIPTION

Figure 1:
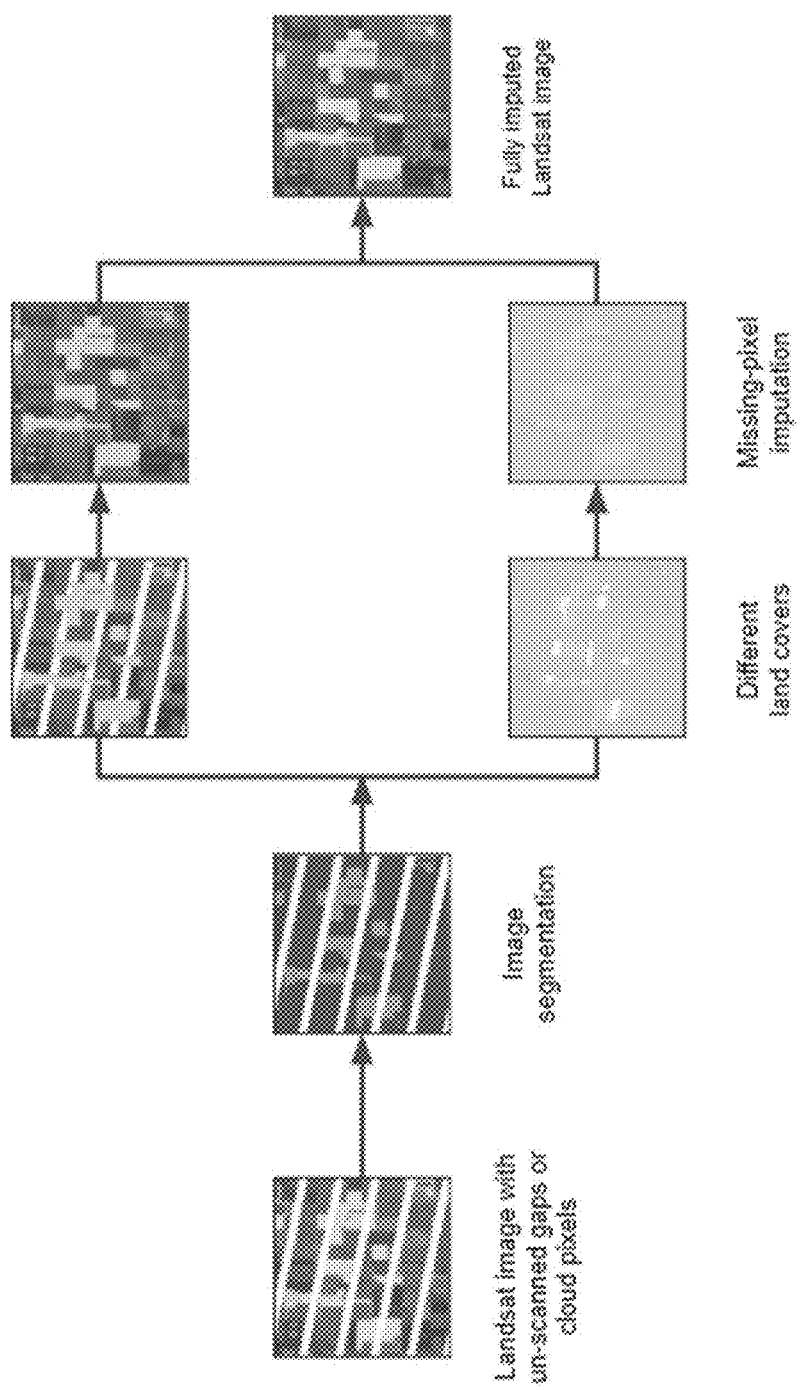
FIG. 1 depicts a missing-value pixels imputation process according to an illustrative embodiment (STAIR). To impute the missing-value pixels, the embodiment first partitions the image into multiple segments, in which each segment contains one type of homogeneous pixels. Missing-value pixels are imputed separately in each segment, using an adaptive-average correction process.

As described herein, various embodiments provide for generating cloud-free and/or gap-free product (e.g., cloud-free and/or gap-free images showing surface reflectance).

One or more of the exemplary embodiments provides a generic and fully-automated method to fuse multiple sources of optical satellite data to generate a high-resolution, daily and cloud-/gap-free surface reflectance product. For example, the method can generate a daily, 30-meter and cloud-/gap-free surface reflectance time series. The method can outperform the classic STARFM in various metrics. The method is computationally efficient and ready to be scaled up to continental scales.

One embodiment of the subject disclosure entails a method that includes partitioning, by a processing system including a processor, an image into a group of segments, where each segment of the group of segments includes pixels corresponding to one type of homogeneous pixels. The processing system can determine a relative difference for each segment of the group of segments. The processing system can adaptively correct pixels in gaps that are classified to each segment according to the relative difference to generate an adaptively corrected image.

Another embodiment of the subject disclosure entails a device including a processing system having a processor; and a memory that stores executable instructions that, when executed by the processing system, facilitate performance of operations. The processing system can obtain first and second groups of images, where the first group has a higher resolution and a lower frequency temporal pattern (e.g., lower acquisition frequency) than the second group of images. The processing system can integrate available matching pairs of images of the first and second groups over a predetermined range of dates and calculate a calculated difference for aligned pixels of the first and second groups for each date of the predetermined range of dates. The processing system can obtain an estimated difference for the aligned pixels for each date of the predetermined range of dates based on linear interpolation. The processing system can generate predicted images based on the estimated difference.

Yet another embodiment of the subject disclosure entails a non-transitory, computer readable medium, comprising executable instructions that, when executed by a processing system including a processor, facilitate performance of operations. The processing system can obtain three or more groups of images, where each of the groups of images are satellite images that have one of a different resolution, a different frequency temporal pattern or a combination thereof than one of other groups of images. The processing system can perform image fusion using the three or more groups of images in an iterative process utilizing image pairs from different groups of the three or more groups to generate predicted images.

One or more of the exemplary embodiments provide a data fusion method, such as fusion of satellite images, to address challenges of existing methods that often have limited integration ability to fuse multiple-sources of optical satellite data where for the existing methods: i) at most two manually-selected satellite image pairs can be used to fuse a predicted image; ii) image gaps due to clouds and sensor mechanic issues (e.g., SLC-off in Landsat 7) cannot be filled. One or more of the exemplary embodiments provide a data fusion method which does not heavily rely on the availability of clear satellite images on matching dates as do the existing methods. One or more of the exemplary embodiments can take a time series that includes or consists of any number of satellite image pairs to fuse the predicted images, fully exploiting the useful information available in the input time series. One or more of the exemplary embodiments are fully-automated and do not require users to manually specify clear image pairs. One or more of the exemplary embodiments provide a data fusion method that is sufficiently generic to include various optical satellite data for fusion. As an example, one or more of the exemplary embodiments can provide effective means to leverage historical optical satellite data to build long-term daily, 30 m surface reflectance record (e.g., from 2000 to present) at continental scales for various applications, as well as produce operational near-real time daily and high-resolution data.

One or more of the exemplary embodiments provide a data fusion method to address the desire by scientific research and societal applications for surface reflectance data with high resolutions in both space and time. Standard satellite missions could not provide such data at both high resolutions. Fusion approaches that leverage the complementary strengths in various satellite sources (e.g., MODIS/VIIRS/GOES-R's sub-daily revisiting frequency and Landsat/Sentinel-2's high spatial resolution) provide an ability to simultaneously achieve both high resolutions in the fusion data.

One or more of the exemplary embodiments provide a data fusion method such as STAIR (SaTellite dAta IntegRation). STAIR can be a generic and fully-automated method for fusing multi-spectral satellite data to generate a high-frequency, high-resolution and cloud-/gap-free data. Building on the time series of multiple sources of satellite data, STAIR can first impute the missing-value pixels (e.g., due to cloud cover and/or sensor mechanical issues) in satellite images using an adaptive-average correction process, which takes into account different land covers and neighborhood information of miss-value pixels through an automatics segmentation. To fuse satellite images, STAIR can employ a local interpolation model to capture the most informative spatial information provided by the high spatial resolution data (e.g., Landsat) and then can perform an adjustment step to incorporate the temporal patterns provided by the high-frequency data (e.g., MODIS). The resulting fused products of STAIR contain daily, high spatial resolution and cloud-/gap-free fused images.

STAIR has been tested to fuse surface reflectance data of MODIS and Landsat in Champaign County at Illinois and generated daily time series for all the growing seasons (April 1 to November 1) from 2000 to 2015 at 30 meter resolution.

Extensive experiments demonstrated that STAIR not only captures correct texture patterns but also predicts accurate reflectance values in the generated images, with a significant performance improvement over the classic STARFM algorithm. This method is computationally efficient and ready to be scaled up to continental scales. It is also sufficiently generic to easily include various optical satellite data for fusion. STAIR can provide effective means to leverage historical optical satellite data to build long-term daily, 30 m surface reflectance record (e.g., from 2000 to present) at continental scales for various applications, as well as produce operational near-real time daily and high-resolution data for future earth observation applications.

One or more of the exemplary embodiments address the fact that standard satellite missions always have to live with the trade-offs between spatial resolution and temporal frequency. High spatial resolution and high revisiting frequency cannot be achieved simultaneously at one satellite sensor. For example, coarse-resolution satellite data have daily (e.g., MODIS and VIIRS) or even sub-hourly sampling frequency (e.g., GOES-R), but their spatial resolution is low (500 m-a few km); high-/medium-resolution satellite data have much finer spatial granularity (e.g., Landsat: 30 m, Sentinel-2: 10 m), but the sampling frequency is low (multiple days to weeks). On the other hand, societal applications have a pressing need for more satellite data that have high resolutions in both space and time (Hossain, 2015; Henson, 2008; Denis et al., 2017). Specifically for agricultural related applications, field level information (a few meters to tens of meters) is needed to guide farmers' precision management (Mulla 2013), while rapid and subtle changes of crop growth condition or crop disturbance after extreme weather events require high frequency images (e.g., daily) to capture (Gao et al., 2017). Similar requirements are called for ecosystem monitoring and conservation (e.g., disturbance and change detection) (Hansen et al., 2013), urban applications (Stone et al., 2001; Imhoff et al., 2010), and economic surveillance (Jean et al, 2016), etc. The exemplary embodiments can provide the data needed for these situations.

The availability of high-/medium-resolution satellite data (e.g., Sentinel-2 and commercial satellites) can be helpful, but data gaps inevitably still exist and remain challenging to be filled. For example, though an increased sampling frequency can help to a certain extent, pervasive tropical cloudiness can affect image quality, and the overlaps of rainy season and crop-growing season in rainfed agriculture (which produce ~75% of total global staple crop) (Portmann et al., 2010) can pose challenges for optical sensors to get frequent and clear-day images for crop monitoring. Integrating all the available and complementary information from multiple sources of satellite data may increase information contents and reduce data gaps via methods to integrate various satellite data for a fused product that can have both high resolutions in space and time.

One or more exemplary embodiments can provide improved data over STARFM for local or regional applications in crop monitoring, ecosystem disturbance detection, field-level disaggregation of evapotranspiration, and more.

One or more of the exemplary embodiments are not restricted as are STARFM and ESTARFM that, using a weighted neighborhood voting process, rely upon the availability of clear Landsat and MODIS images on matching dates, which is not often the case in practice. One or more of the exemplary embodiments can overcome problems associated with satellite images that contain missing values due to cloud contamination and/or un-scanned pixels (e.g., failure of Scan Line Corrector (SLC-off) in Landsat 7), which makes it difficult to search Landsat-MODIS image pairs on match dates that are temporarily close to the target date. One or more of the exemplary embodiments can overcome the problem of STARFM of failing to predict the value of this pixel in the fine-resolution output image when a single pixel was cloud contaminated in both of two input Landsat images. One or more of the exemplary embodiments can overcome the problem of seeking the data availability at the cost of prediction accuracy, where image pairs that are months apart from the target date would provide less accurate information for the data fusion process.

To address the above challenges, in one or more embodiments STAIR is provided which is a generic fusion method, and has been tested for the Landsat-MODIS fusion. In one embodiment, STAIR provides improved data integration ability. In one embodiment, STAIR can take a time series that includes or consists of any number of Landsat-MODIS image pairs, systematically integrates the information available in the time series for missing-pixel imputation, and/or automatically determines the weight that each pair should contribute to the data fusion for the target date. By integrating the data in the time series, one or more of the exemplary embodiments can fuse a fine-resolution image without any unfilled pixels.

In one embodiment, STAIR was tested to gap-fill and fuse the surface reflectance data of Landsat and MODIS for the Champaign County, Illinois, from 2000 to 2015, to generate a 30 meter, daily and cloud-/gap-free product for the six spectral bands: red, green, blue, near-infrared (nir), shortwave infrared 1 (swir1), and shortwave infrared-2 (swir2). Experiment results demonstrated that the exemplary embodiment produces a more robust missing-pixel imputation of heterogeneous pixels, captures the correct texture patterns and features in the predicted image at a fine resolution, and predicts the values of surface reflectance more accurately than the existing method STARFM. Overall, the exemplary embodiments provide fusion products with high quality and high accuracy, and would serve as a practical tool for various remote sensing based applications.

Figure 2:
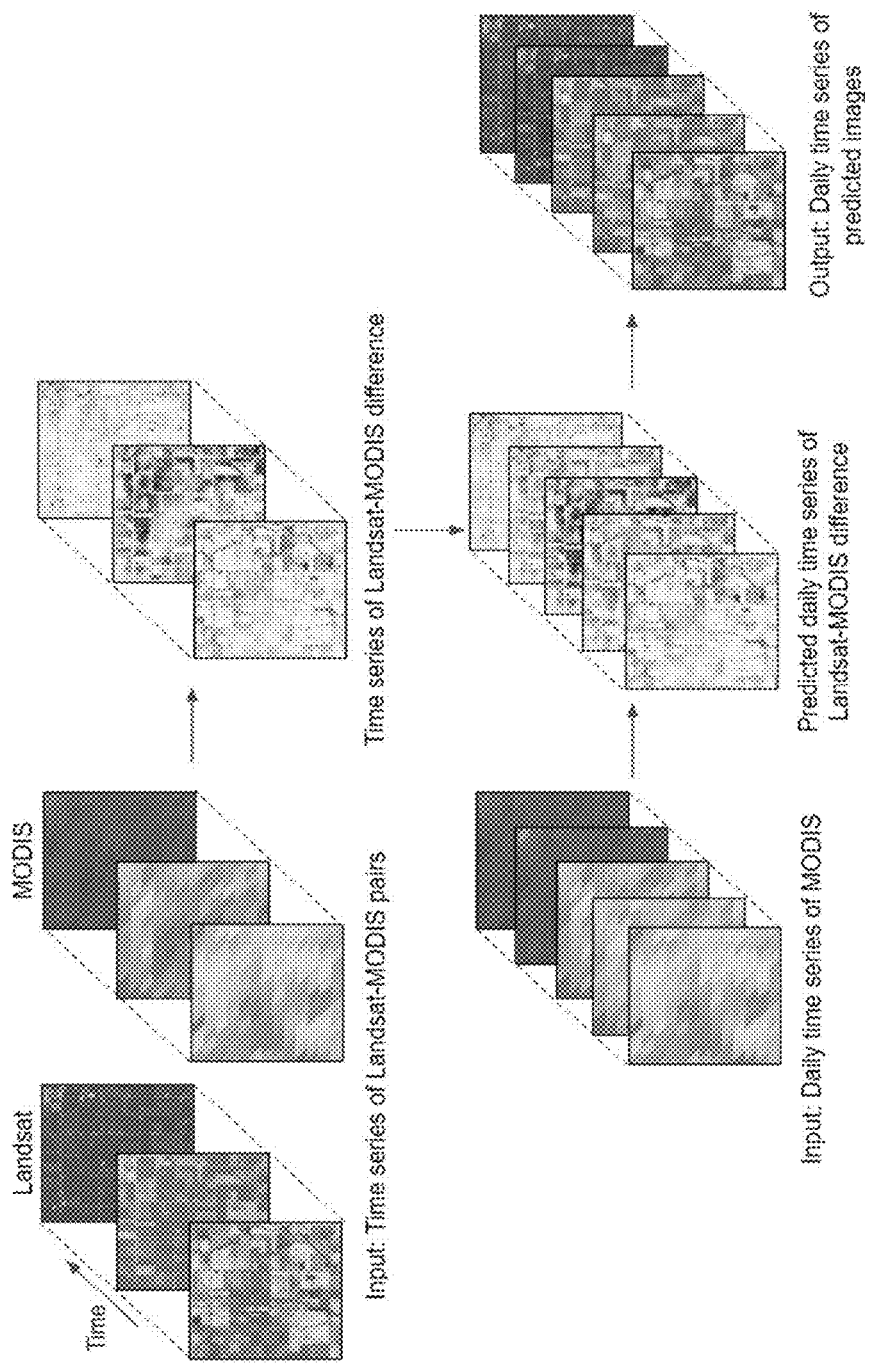
FIG. 2 depicts a fusion method according to an embodiment (STAIR). Taking a time series of Landsat-MODIS pairs as input, the embodiment can model and predict the Landsat-MODIS difference at a daily level, capturing the fine-resolution spatial information. The input daily time series of MODIS data can then be used to further correct the temporal patterns in the predicted time series of Landsat-MODIS difference, generating daily time series of predicted images.

In one embodiment, STAIR provides a generic method to fuse multiple satellite imageries (e.g., surface reflectance) into daily high-resolution products. STAIR takes time series image data from two or more sources of satellite data as input, imputes pixels with missing value in images (as shown in the embodiment of FIG. 1), and generates high-resolution and high-frequency products through a fusion process (as shown in the embodiment of FIG. 2). By integrating and fusing multiple different types of satellite data, the exemplary embodiments can simultaneously capture both the temporary changing trends and spatial texture patterns provided by each type of data.

One or more of the exemplary embodiments can address missing-pixel imputation. Due to failure of the scan-line corrector (SLC) of the Landsat 7 Enhanced Thematic Mapper Plus (ETM+) sensor in 2003, roughly 22% pixels remained to be unscanned as strips with missing values in Landsat 7 images, which are referred to as SLC-off images (Arvidson et al., 2006; Ju & Roy, 2008). The un-scanned pixels have become one of the major limitations of the applicability of Landsat 7 images thereafter due to the missing information in areas corresponding to the un-scanned pixels. In addition, Landsat/MODIS images of frequently cloudy areas often have a large fraction of missing-value pixels masked out by the cloud mask, and contain only a small portion of pixels with unmasked values. The gap filling, in one or more exemplary embodiments, of the un-scanned and cloudy pixels thus not only help recover the complete view of a Landsat/MODIS image, but also facilitate downstream applications and analysis, such as data fusion of Landsat-MODIS images.

One naive approach for filling the gaps in Landsat images is to use a linear regression method to interpolate the missing values in a Landsat image based on the available values of the same areas in other temporarily close Landsat images. The rationale behind this approach is that, in a reasonable short time frame, the values of surface reflectance tend to change linearly. This property of local linearity enables one to derive the missing surface reflectance values in a SLC-off image by linearly interpolating the values of another one or two Landsat images on other dates (referred to as reference images), where the surface reflectance of the same region are not missing. If there are more than one reference image available temporarily close to the SLC-off image within a short time frame, one can fit a linear regression model to obtain a more robust estimation of the missing value in the SLC-off image. Since strips in Landsat 7 SLC-off images are generally offset in the time series over the same region, and Landsat 7 and 8 are functioning without un-scanned gaps, it is likely to find available gap-free pixels in other dates that are temporarily close to the date where the image is SLC-off. This makes the linear interpolation an approach for gap filling. Specifically, let $L(p_g,t_0)$ be the surface reflectance value at pixel $p_g$ in the un-scanned strips of a SLC-off image at date $t_0$, and $L(p_g,t_1), \ldots, L(p_g,t_m)$ be the pixels at the same position in other m gap-free reference images at dates $t_1, \ldots, t_m$, respectively. Here, the two reference images are not required to be completely gap-free within the whole image. It is sufficient that the reference images are gap-free over a small region that covers the pixel $p_i$. To derive the value $L(p_g,t_0)$, a linear regression model can be utilized, where the missing value $L(p_g,t_0)$ is filled as $$L_{linear}(p_g,t_0)=at_0+b$$

where a and b are the slope and intercept of the linear regression model, respectively, fitted by values $L(p_g,t_1), \ldots, L(p_g,t_m)$. For the simplicity of notations, it can be assumed that the date $t_j$ (j=0, 1, . . . , m) is represented by the day of the year so that it can be used for numeric computation.

The linear interpolation based approach does not always give the accurate gap filling of the missing pixels, which may be due to: i) the time series of surface reflectance may change rapidly in some time frame throughout the year and loses the local linearity, and ii) the systematic bias of the reference images may lead to inaccurate linear interpolation, causing the derived value of missing values in the SLC-off images to be over- or under-estimated. In one or more embodiments, to produce high-quality gap-filled images as input for a fusion algorithm, the magnitude of filled pixel values should match that of the original pixel values out of gaps, without displaying visually different color scales. A key observation is that although inharmonic with the original pixels out of the gaps, the filled gaps have captured the correct texture patterns. Therefore, the biased color scale of the filled pixels can be corrected using a neighborhood correction method.

The rationale behind a neighborhood correction method for gap filling is that the relative relationship between a pixel and a neighborhood pixel of it remains roughly the same across different dates in the time series of Landsat data, especially in a short time frame. For example, let $L(p_g,t_0)$ be the value at a pixel $p_g$ in the un-scanned strips of a SLC-off image at date $t_0$, and $L(p_f,t_0)$ be the value at a pixel $p_f$ in the same SLC-off image, which is a neighborhood pixel of $p_g$ and out of the strips. Similarly, let $L(p_g,t_1)$ and $L(p_f,t_1)$ be the values of pixels on the same positions in a gap-free image at another date $t_1$. Note that here $L(p_g,t_1)$ is not a missing value. The assumption is that if the two dates $t_0$ and $t_1$ are within a short time frame (e.g., less than 2-3 weeks), the relative relationship between pixels $p_g$ and $p_f$ will remain roughly the same. That is, $$L(p_g,t_0)-(p_f,t_0) \approx L(p_g,t_1)-L(p_f,t_1)$$

Based on this assumption, the relative difference can first be computed between the pixel $p_g$ and $p_f$ in the clear gap-free image, and this relative difference can be used to correct the value $L_{linear}(p_g,t_0)$ derived by the linear regression model. To make the correction more robust and reliable, the relative difference is not computed using values at two single pixels. Instead, the relative difference is calculated between two "communities" of pixels:

$$\delta=\underline{L}(C_g,t_1)-\underline{L}(C_f,t_1)$$

where $C_g$ is the set of all pixels that lie in the gaps of the SLC-off image, $C_f$ is the set of all pixels that are located out of the gaps; $\underline{L}(C_g,t_1)$ is the average value of pixels in the set $C_g$ and $\underline{L}(C_f,t_1)$ has the similar meaning. The global average makes the estimation of the relative difference more robust to the inherent noise or error of the data. The global-average correction of $L_{linear}(p_g,t_0)$ is subsequently computed as $$L_{global}(p_g,t_0)=L_{linear}(p_g,t_0)+\underline{L}(C_f,t_0)+\delta$$

where $\underline{L}(C_f,t_0)$ is the average value of pixels in the set $C_f$ of the SLC-off image at date $t_0$. This approach can be referred to as imputation with global-average correction.

Different types of land cover may exhibit different trends of change in the time series of surface reflectance. A global correction on the derived values for heterogeneous pixels may not lead to corrected values that are simultaneously compatible with all types of land cover. For instance, it was observed that at the end of the growing season, the global correction on the derived values accurately corrected the values for one crop type, but the corrected values for another crop type were still visually incompatible, in part due to different and rapid change patterns of the two crop types in the time series. To take into account the different change patterns of heterogeneous pixels, the gap-filling algorithm of various embodiments can be extended to adaptively correct the filled values for different land cover types separately.

Referring to FIG. 1, an SLC-off image can be partitioned into multiple segments, where each segment contains the pixels corresponding to one type of homogeneous pixels. The exemplary method can automatically (e.g., without receiving user input selecting a number of segments) choose the number of segments that best describes the number of types of homogeneous pixels in an image. In one embodiment, a clustering algorithm can be employed to partition the image into multiple segments, such that pixels of the same homogeneous type are grouped together.

With respect to crop evaluation, as the dominant crop types in the study areas of this work are corn and soybean, and each crop type contains relatively homogeneous pixels, the images can be partitioned into two segments. For instance, the histogram distribution of values in the image can be exhaustively searched, and the optimal threshold can be found that minimizes the intra-segments variance, based upon which the image can be partitioned into two segments (e.g., Otsu's method (Otsu, 1979)). However, despite illustrating applications for images with two crop types, the exemplary embodiments can also effectively find an optimal segmentation for images that contain more land cover types or more heterogeneous pixels. After the image segmentation, the relative difference can be computed for each segment c as follows:

$$\delta_c = \underline{L}(C_{g,c}, t_1) - \underline{L}(C_{f,c}, t_1)$$

where $C_{g,c}$ represents the set of pixels in gaps that are classified to segment c, and similar meaning for $C_{f,c}$. Next, we adaptively correct each gap pixel $p_{g,c}$ of segment c, $$L_{adap}(p_{g,c}, t_0) = L_{linear}(p_{g,c}, t_0) + \underline{L}(C_{f,c}, t_0) + \delta_c$$

This approach can be referred to as imputation with adaptive-average correction. Previous algorithms for gap-filling include NSPI (Chen et al., 2011) and GNSPI (Zhu et al., 2012), which can only process a single SLC-off image at a time, and require users to specify a reference image to fill gaps in the SLC-off image. In contrast, the imputation method of various embodiments can perform the missing-value pixel imputation for all images in the time series at a time. Various embodiments do not require users to specify the reference image, and such embodiments will automatically choose reference images that can be used to impute the missing-value pixels. An exemplary method can hence be better integrated with a fully-automated fusion algorithm, which will be described below.

In one or more embodiments as illustrated in FIG. 2, a fusion method can be applied for integrating satellite data (e.g., Landsat and MODIS data) into a synthetic product with both high spatial and high temporal resolutions. Taking the time series of Landsat and MODIS images observed on matching days as input, the exemplary method can capture fine-grained information (e.g., provided by Landsat images), and can utilize more frequent images (e.g., the daily MODIS images) to further correct the temporal change patterns in the predicted time series of images. In contrast to previous fusion algorithms (e.g., STARFM (Gao et al., 2006)) which can take only one or two Landsat-MODIS pairs as input, various exemplary embodiments can process a time series that consists of a much larger number of Landsat-MODIS pairs (e.g., a time series of images that covers the growing season in a year), fully exploiting the spatial and temporal information in the time series.

One goal of various exemplary embodiments is to fuse Landsat and MODIS data into images with both high-resolution spatial information and frequent temporal coverage for n dates $t_i$ (i=1, 2, ..., n), and there are k matching pairs of Landsat and MODIS images that acquired on the same dates $T_j$ (j=1, 2, ..., k) among the n dates (note that previous methods such as STARFM only supports k=1 or 2). Here, it is assumed the MODIS image M has been aligned and super-sampled to the resolution and bounds of the Landsat image L, and hence has the same image size, pixel resolution and projected coordinate system. The MODIS data $M(x,y,t_i)$ is also available for each date $t_i$ (i=1, 2, ..., n) where the fine-resolution image will be predicted.

As an example, consider one Landsat image L and one MODIS image M that are acquired on the same date $T_j$, the relationship for a homogeneous pixel between the Landsat image and the MODIS image can be modeled as $$L(x,y,T_j) = M(x,y,T_j) + \epsilon(x,y,T_j),$$

where (x,y) is the location of the aligned pixel of Landsat and MODIS data, $T_j$ is the acquisition date for Landsat and MODIS data, and $\epsilon(x,y,T_j)$ is the difference between Landsat and MODIS data of position (x,y), due to measurement errors, solar/viewing angle geometry, noise and/or systematic biases (Zhu et al., 2010). Suppose the aim is to predict a fine-resolution image on date $t_p$ where only the MODIS data $M(x,y,t_p)$ is available but the Landsat data is unknown. The predicted image $I(x,y,t_p)$ can be represented as $I(x,y,t_p) = M(x,y,t_p) + \Delta(x,y,t_p)$, where $\Delta(x,y,t_p)$ is the difference between the MODIS image M and the predicted fine-resolution image I of position (x,y) at date tp. To obtain the difference $\Delta(x,y,t_p)$ of each position (x,y) at date $t_i$ for which the fine-resolution image is to be predicted, all the k available matching pairs of Landsat and MODIS data on dates from $T_1$ to $T_k$ can be integrated and the accurate difference between Landsat and MODIS data for each date $T_j$ (j=1, ..., k) can be calculated as follows:

$$\epsilon(x,y,T_j) = L(x,y,T_j) - M(x,y,T_j).$$

The difference $\epsilon(x,y,T_j)$ can be linearly interpolated into each dates $t_i$ for which a fine-resolution image is to be predicted, and hence an estimated difference $\Delta(x,y,t_i)$ for all positions (x,y) on each date $t_i$ is obtained. Intuitively, the estimates $\Delta(x,y,t_i)$ of image differences capture the most informative and high-resolution spatial information provided by Landsat data. To obtain the prediction of the fine-resolution image $I(x,y,t_i)$, MODIS data can be used to further correct the spatial information encoded in $\Delta(x,y,t_i)$ as follows $$I(x,y,t_i) = M(x,y,t_i) + \Delta(x,y,t_i)$$

This step can be thought of as an adjustment step that incorporates the high-frequency temporal patterns provided by MODIS data. The predicted images $I(x,y,t_i)$ (i=1, 2, ..., n) thus can capture both high-resolution spatial and temporal information.

In one embodiment, a dataset is built to cover Landsat and MODIS images of Champaign County, IL, in multiple years to evaluate the fusion performance of various exemplary embodiments. To perform a comprehensive evaluation to assess the ability of the method under different conditions (e.g., time points and satellite sensors), the Landsat and MODIS images in the dataset were selected to cover a wide temporal range, i.e., growing seasons (April 1-November 1) of years from 2000 to 2015, and cover six spectral bands (i.e. red, green, blue, nir, swir1, and swir2). Specifically, surface reflectance data was collected of all the Landsat data covering this period (i.e., Landsat-5 TM, Landsat-7 ETM+, Landsat-8 OLI) (Masek et al., 2006; Roy et al., 2014), and MODIS MCD43A4 Nadir BRDF-Adjusted Surface Reflectance (NBAR) products (Schaaf et al., 2002; Wang et al., 2015) for the year 2000 to 2015 that cover Champaign County, IL. Each of the three Landsat products has 30 m spatial resolution but low temporal resolution (16-day revisit cycle), and are often cloud-contaminated. While the MODIS product has a more frequent revisit cycle (daily) but a coarse spatial resolution is with (500 m) resolution. Both Landsat and MODIS surface reflectance data have gone through radiance calibration and atmospheric corrections and only clear-day pixels are used, i.e., the fmask algorithm (Zhu & Woodcock, 2012) is applied to Landsat to remove cloudy pixels, and only "good quality" flagged pixels in MODIS data are used for fusion. MODIS MCD43A4 data have also been adjusted and normalized to be nadir view at local solar noon time, using the BRDF correction (Strahler & Muller, 1999). The standard surface reflectance data of Landsat has not been BRDF-corrected, but due to the small field of view in Landsat (±7.5° from nadir), Landsat can be largely regarded as in nadir view (Gao et al., 2006). Landsat and MODIS data are co-registered and resampled before implementing the exemplary method.

To evaluate the performance of fusion results, Landsat images were selected that were captured during growing seasons (April 1 to November 1) in years from 2000 to 2015 and with the percentage of non-cloudy pixels greater than 60%. Multiple image patches were then sampled with size 200×200 pixels uniformly at random from each of these images, such that every pixel was covered once on average. These image patches were held out as ground truth (referred to as ground truth images) for evaluating fusion performance.

The exemplary method was compared with STARFM (Gao et al., 2006), the most widely used fusion algorithm for Landsat-MODIS images. The "two-pair" option of STARFM was utilized, in which two Landsat-MODIS pairs (referred to as reference image pairs) and the MODIS image at the predicted date were used to produce a fine-resolution image at the predicted date. STARFM does not provide automatic routine to select the two reference pairs for fusion, a user was thus required to make a selection and that selection was of two Landsat-MODIS pairs that were within 20 days apart from the ground truth image and with the percentage of non-cloudy pixels greater than 60%. Ground truth images that were not accompanied by two reference image pairs satisfying this criterion were filtered out in this evaluation. The temporal distance (20 days) between the reference image pairs and the ground truth image set for STARFM was much smaller than the one that has been used in previous works of STARFM (Gao et al., 2006). It is further noted that these experimental settings (high-quality reference image pairs and short temporal distance) are favorable to STARFM, and potentially benefit STARFM to produce more accurate fusion results.

Figure 3:
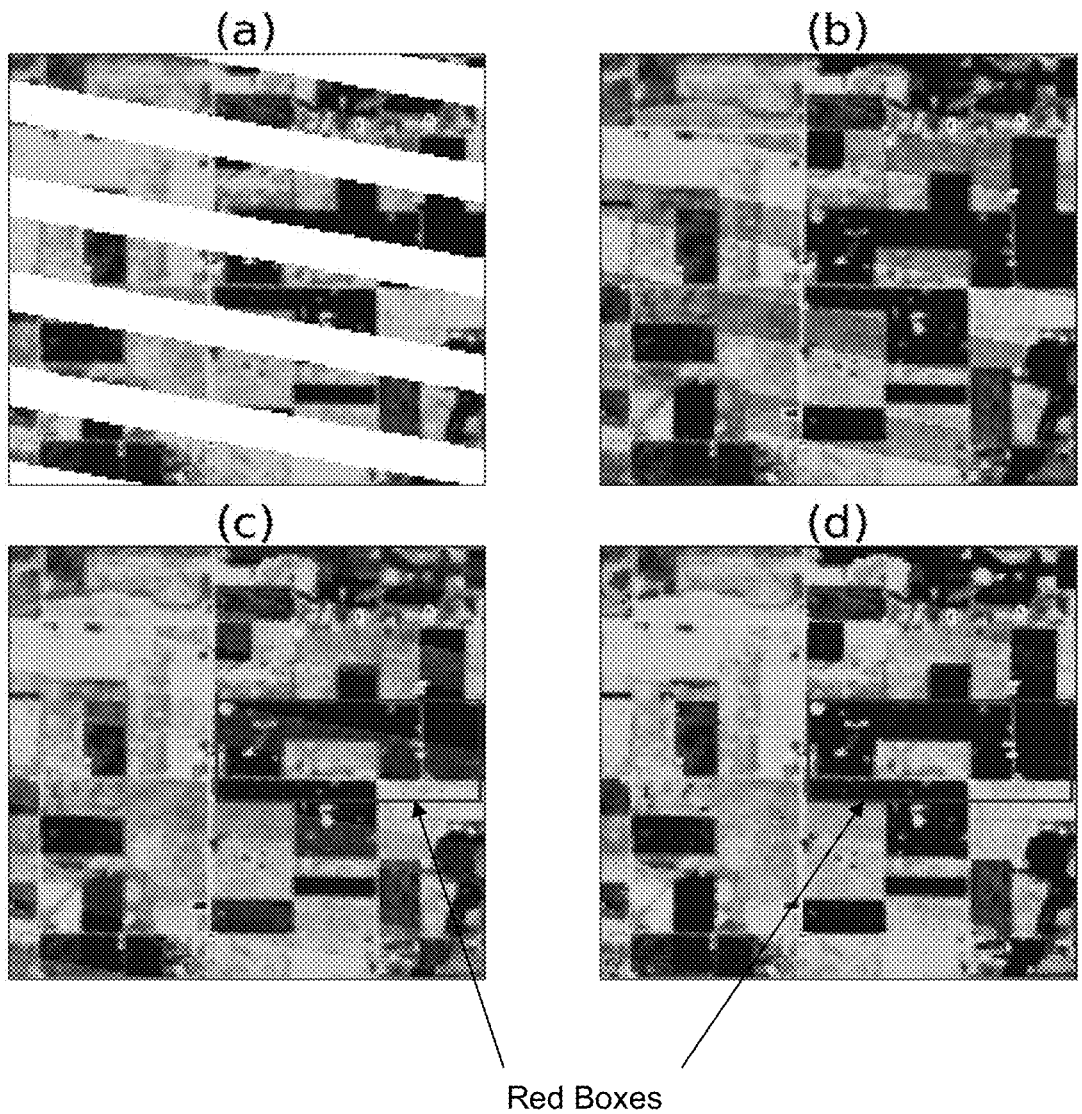
FIGS. 3a-d depict a missing-value pixels imputation using adaptive-average correction according to an embodiment.

The imputation of missing pixels (e.g., cloudy pixels and/or un-scanned gaps in SLC-off images) can facilitate the downstream Landsat-MODIS fusion process. The following illustrates the results of missing-pixel imputation in the exemplary fusion pipeline. The most straightforward way to fill the missing pixels in a Landsat image is to employ a linear interpolation approach based on the available pixel values of the same area in Landsat images of other temporarily close dates. The underlying assumption is that the surface reflectance changes linearly in a short time frame. However, this may not hold for the period in which the surface reflectance changes rapidly and thus exhibits a nonlinear trend. For example, the missing pixels were linearly interpolated in the red band of a SLC-off image on August 28th, 2010 (day of year 240) which was at the end of the growing season as shown by FIG. 3a. The surface reflectance of red band typically drops rapidly in this month in a nonlinear way. As expected, although the linear interpolation completely filled all the missing values in the un-scanned gaps, it was determined that the derived pixels are apparently incompatible with other pixels out of the gaps, displayed at visually different color scales as illustrated in FIG. 3b. The imputation was then tested with a global-average correction approach, in which the missing values were first filled with a linear regression model, and then the bias in filled values was corrected based on the global average of available values in the SLC-off image. It was observed that the imputation with global-average corrected the filled values in one type of land cover accurately, but noticeable gaps still remained in the other type of land cover as illustrated by FIG. 3c. The reason is that the two types of land cover have different change patterns in the time series of surface reflectance. Therefore, the global-average correction approach, which was unaware of the subtle differences in the change patterns of the two types of land cover, may lead to inaccurately corrected values for both of the two land covers simultaneously.

Next, imputation was applied with an adaptive-average correction approach. It was found that the exemplary imputation algorithm with adaptive-average correction successfully addressed this issue as illustrated by a comparison of FIGS. 3c and 3d, red boxes (that is, the adaptive-average approach addressed the issue (demonstrated in FIG. 3d) that hasn't been addressed by the global-average approach (demonstrated in FIG. 3c)). By detecting and decoupling the two types of land cover and correcting filled values separately, the exemplary algorithm produced a unified image, in which all the filled pixels were accurately corrected to the compatible color scale and the previously visually-noticeable gaps were eliminated. This demonstrated the flexibility of the exemplary method on imputing missing values for heterogeneous landscapes.

Taken together, the exemplary missing-pixel imputation algorithm is able to fill the cloudy pixels and/or un-scanned gaps in SLC-off images with high quality. Moreover, the imputation algorithm is robust to nonlinear changing trends and different changing patterns of heterogeneous pixels. Although used as one stage in an exemplary Landsat-MODIS fusion pipeline of an embodiment, the missing-pixel imputation algorithm can also be used as a stand-alone tool as a generic gap-filling method for various image analysis and applications which may or may not be STAIR.

To quantitatively compare the fusion results of the exemplary method with that of STARFM, the selected subset of Landsat images described earlier were first held out as the test dataset. The exemplary method and STARFM were then applied to available Landsat-MODIS pairs to fuse the fine-resolution image on the date of the ground truth image.

Figure 4:
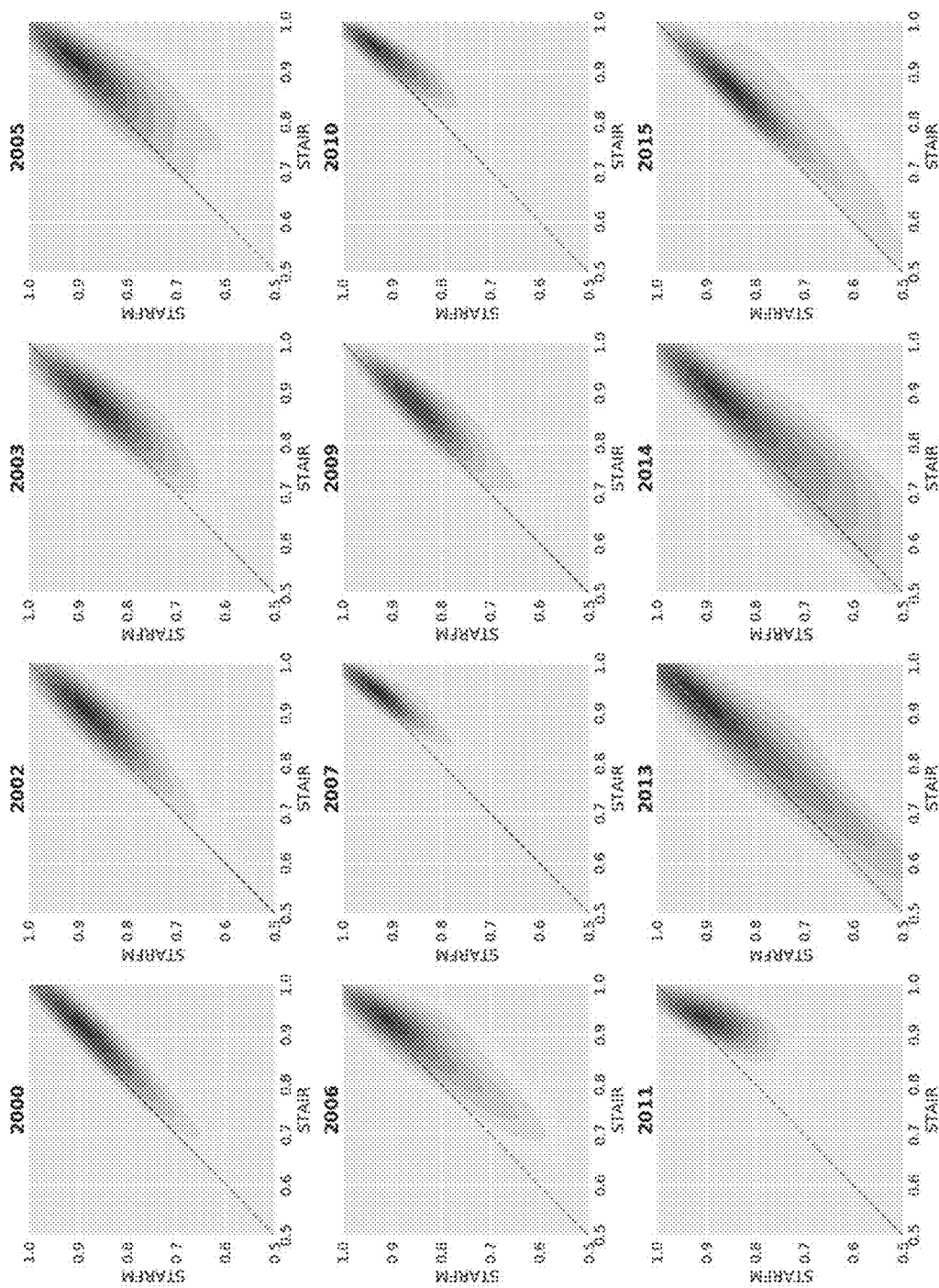
FIG. 4 depicts a pairwise comparison of fusion results of STARFM and a fusion method according to an embodiment (STAIR). The results were evaluated on the Landsat (green band) data spanning multiple years from 2000 to 2015. Pearson correlation was used as the metric to evaluate both methods.
Figure 5:
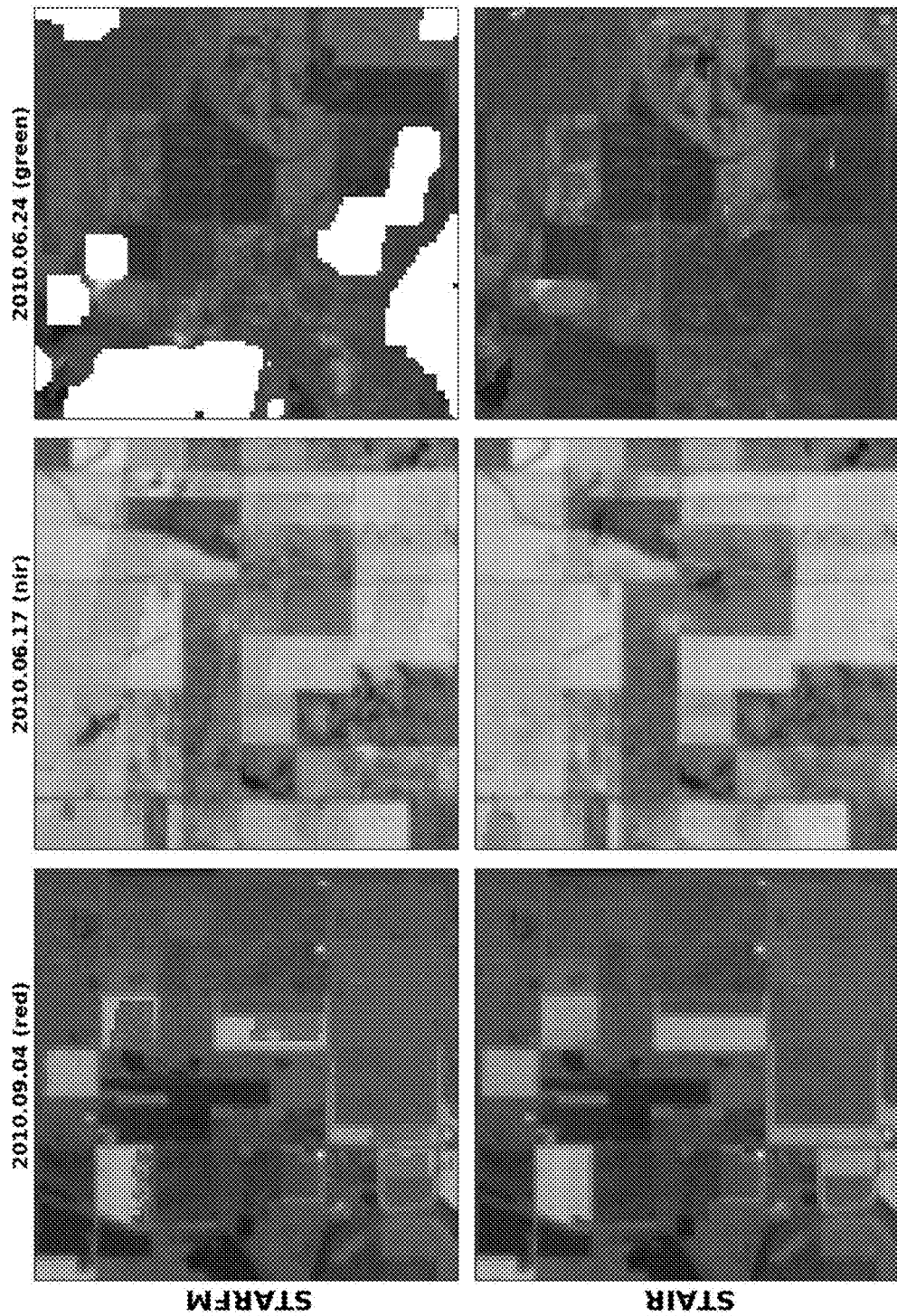
FIG. 5 depicts fused images on different dates and different spectral bands for: (a) a fusion by STARFM in the upper row and (b) a fusion according to an embodiment (STAIR) in the lower row.
Figure 9:
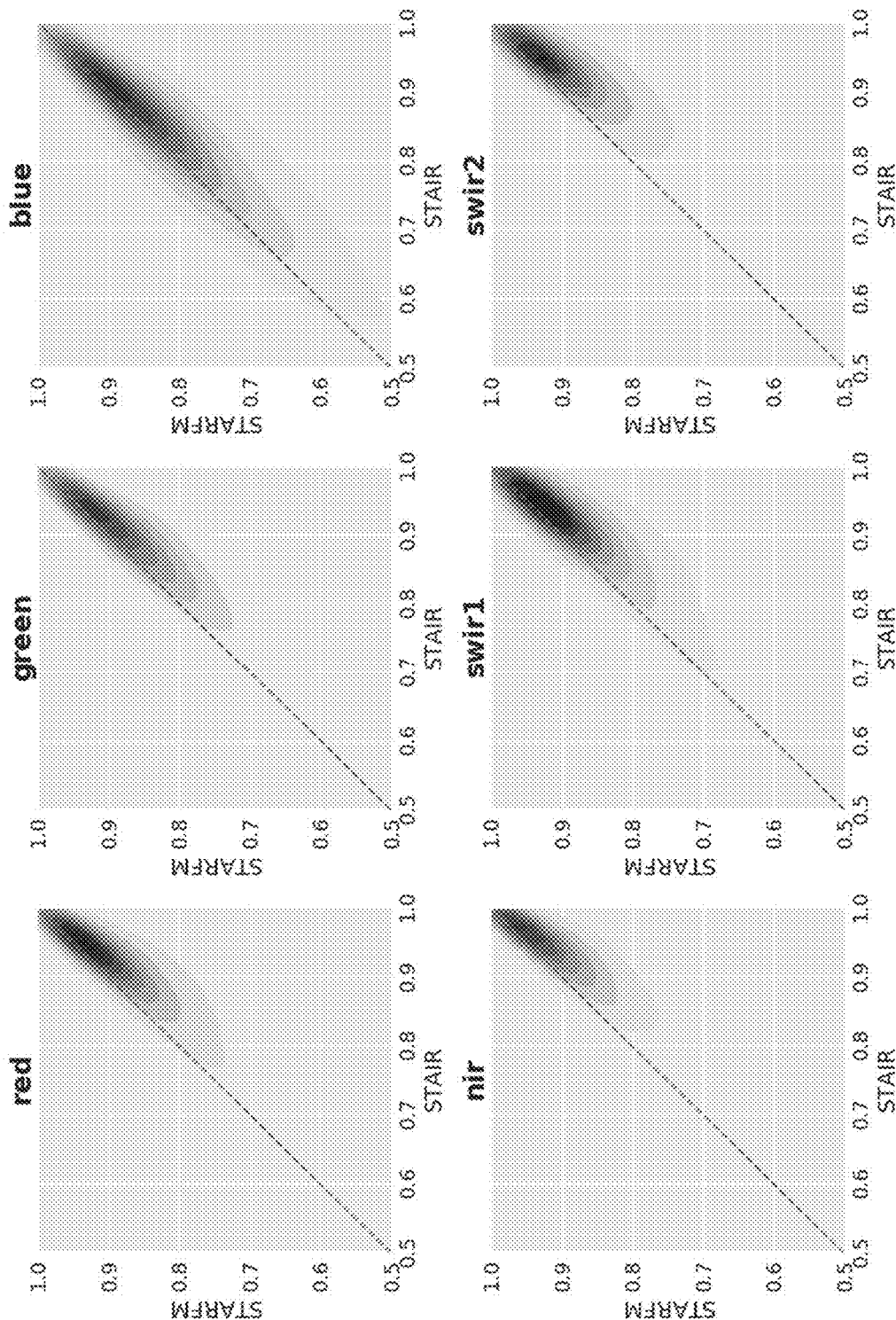
FIG. 9 depicts a pairwise comparison of fusion results of STARFM and a fusion method according to an embodiment (STAIR) on six bands. Each subfigure summarizes the results evaluated on a specific band data of all available years in the test data.

In order to quantify the extent to which the predicted images agree with the actual images, the Pearson correlation was first calculated between the predicted image produced by the exemplary method or STARFM and the ground truth image as illustrated in FIG. 4. This evaluation metric, ranging from −1 to +1, assesses the ability of fusion methods on recovering the correct texture patterns of the target image. The method that can accurately predict the texture patterns of the target image would result in a positive correlation value close to +1, while the method that cannot fully capture the correct texture patterns would lead to a smaller or negative correlation value. The correlation values were compared for the exemplary method and STARFM in all predictions on the test dataset across six spectral bands and multiple years from 2000 to 2015. As the predicted images of the exemplary method never contain missing values while that of STARFM may contain unfilled pixels (e.g., FIG. 5), only those pixels that were not missing values in the predicted images of STARFM were considered when calculating the Pearson correlation, which was a preferable evaluation setting for STARFM. Scatter plots in FIG. 4 show the pairwise comparison on the green band between the exemplary method and STARFM. It was determined that the exemplary method outperformed STARFM when evaluated using the Pearson correlation. In all the years tested in FIG. 4, the exemplary method generally achieved significantly higher correlation than STARFM (one-sided Mann-Whitney U test P value <0.001). These results suggest that the exemplary method performed better than STARFM on recovering the correct texture patterns in the predicted images. For example, FIG. 5 shows the predicted images of the exemplary method and STARFM on different dates and different spectral bands. The fine-resolution image predicted by the exemplary method successfully captured the correct texture patterns in fine resolution and produced a more realistic fused image than STARFM (FIG. 5, left column). In addition, the exemplary missing-value pixels imputation algorithm enables the generation of a more unified fused image, while the fused image of STARFM contains visually-noticeable gaps in a SLC-off image (FIG. 5, middle column). Moreover, by taking the full advantage of time series of satellite data, the exemplary method is able to fill missing-value pixels due to cloud using all available information in the time series, while STARFM is limited to the information in at most two matching image pairs and may fail to impute all cloud-contaminated pixels (e.g., FIG. 5, right column). Similar results were also observed in other spectral bands. Note that the result for years 2001, 2004, 2008 and 2012 are not shown, as there was no Landsat image available in these years that satisfy the criterion of the image selection as test data as described above. Results of comparison of six different bands (r, g, b, nir, swir1 and swir2) can be found in FIG. 9, which suggested that the exemplary method generated fused image with higher correlation across all bands and all years when compared with STARFM.

Figure 6:
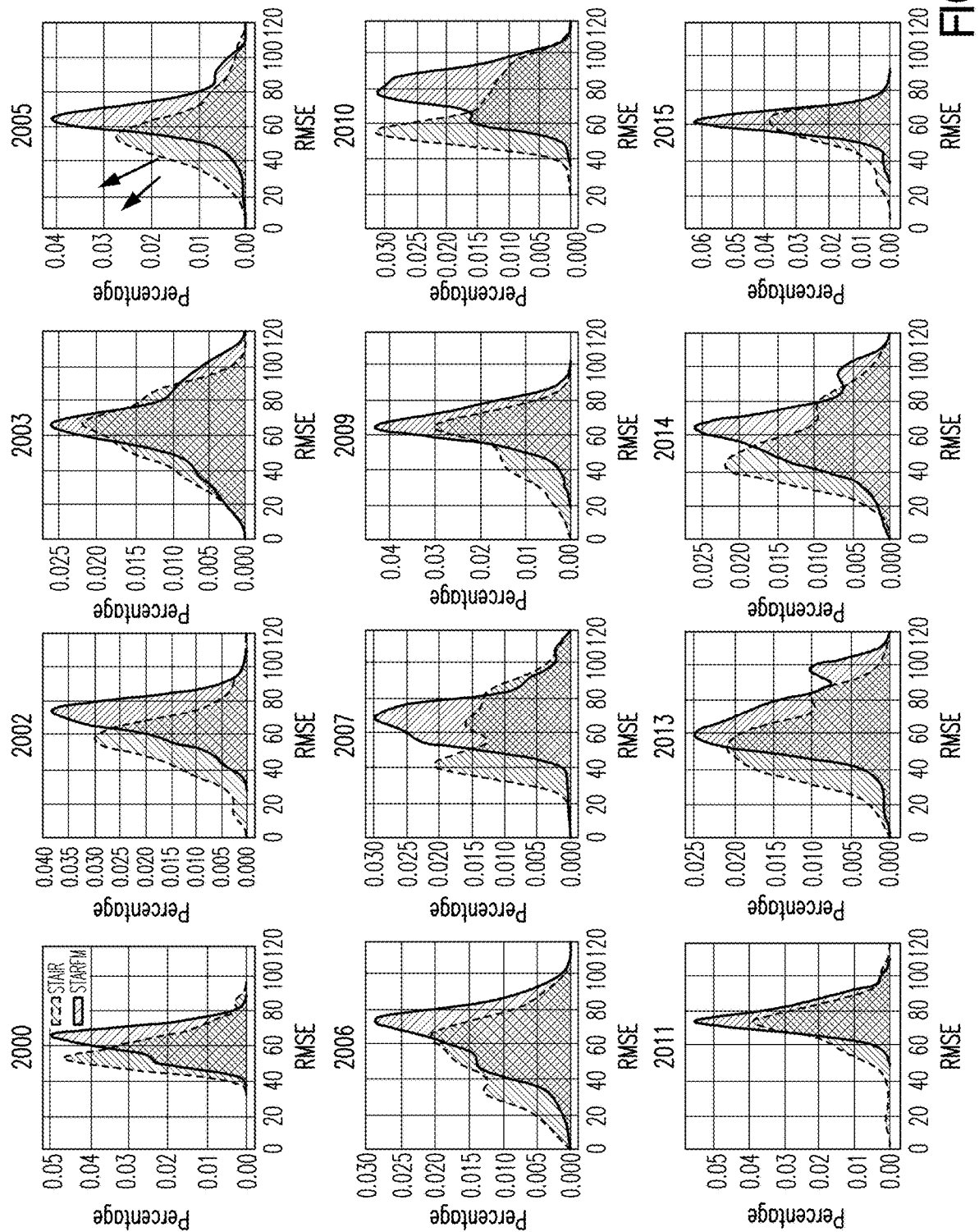
FIG. 6 depicts a histogram of RMSE of STARFM and of a fusion method according to an embodiment (STAIR). The results were evaluated on the Landsat (green band) data spanning multiple years from 2000 to 2015.
Figure 10:
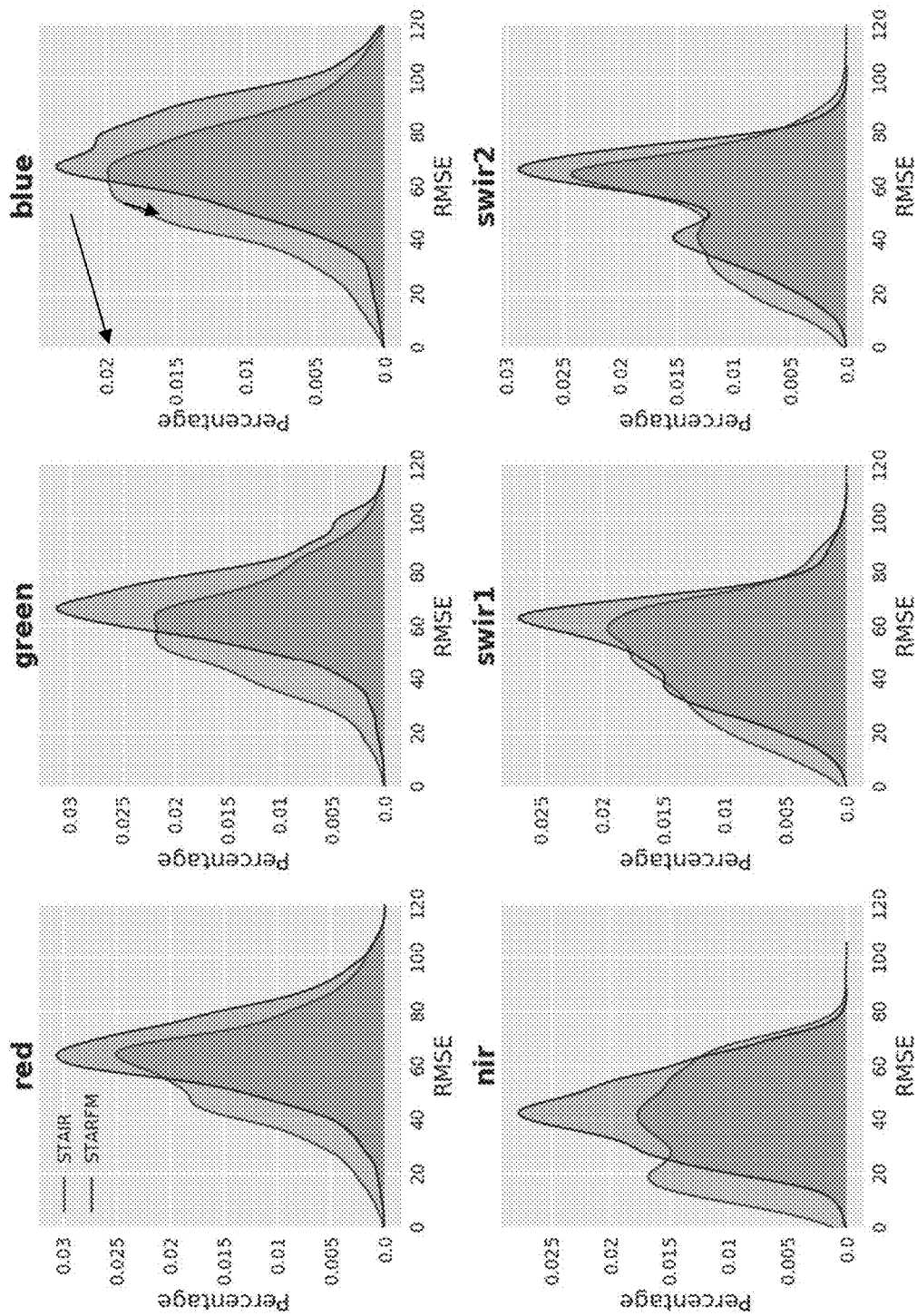
FIG. 10 depicts a histogram of RMSE of STARFM and of a fusion method according to an embodiment (STAIR) on six bands. Each subfigure summarizes the results evaluated on a specific band data of all available years in the test data.

In addition to recovering the realistic texture patterns, it is also desired for a fusion method to predict surface reflectance values at the correct magnitude. To this end, the performance of the exemplary method was further evaluated using the root-mean-square error (RMSE) metric as illustrated in FIG. 6. This metric quantifies the absolute difference of surface reflectance values between a predicted image and the ground truth image. Similarly, RMSE values were calculated for the exemplary method and STARFM in all predictions on the test dataset across six spectral bands and multiple years. Again, the pixels with missing values in the predicted images of STARFM when computing the RMSE were excluded, even if values of these pixels were not missing in our predicted images, providing a preferable evaluation setting for STARFM. Histogram plots in FIG. 6 show the distribution of RMSE values of the exemplary method and STARFM when evaluated on the green band. The RMSE values of the exemplary method were distributed with significantly smaller mean values than that of STARFM (one-sided Mann-Whitney U test P value <0.001). The exemplary method also outperformed STARFM for other bands as illustrated in FIG. 10. These results suggest the predicted images produced by the exemplary method were more close to the actual images.

Figure 7:
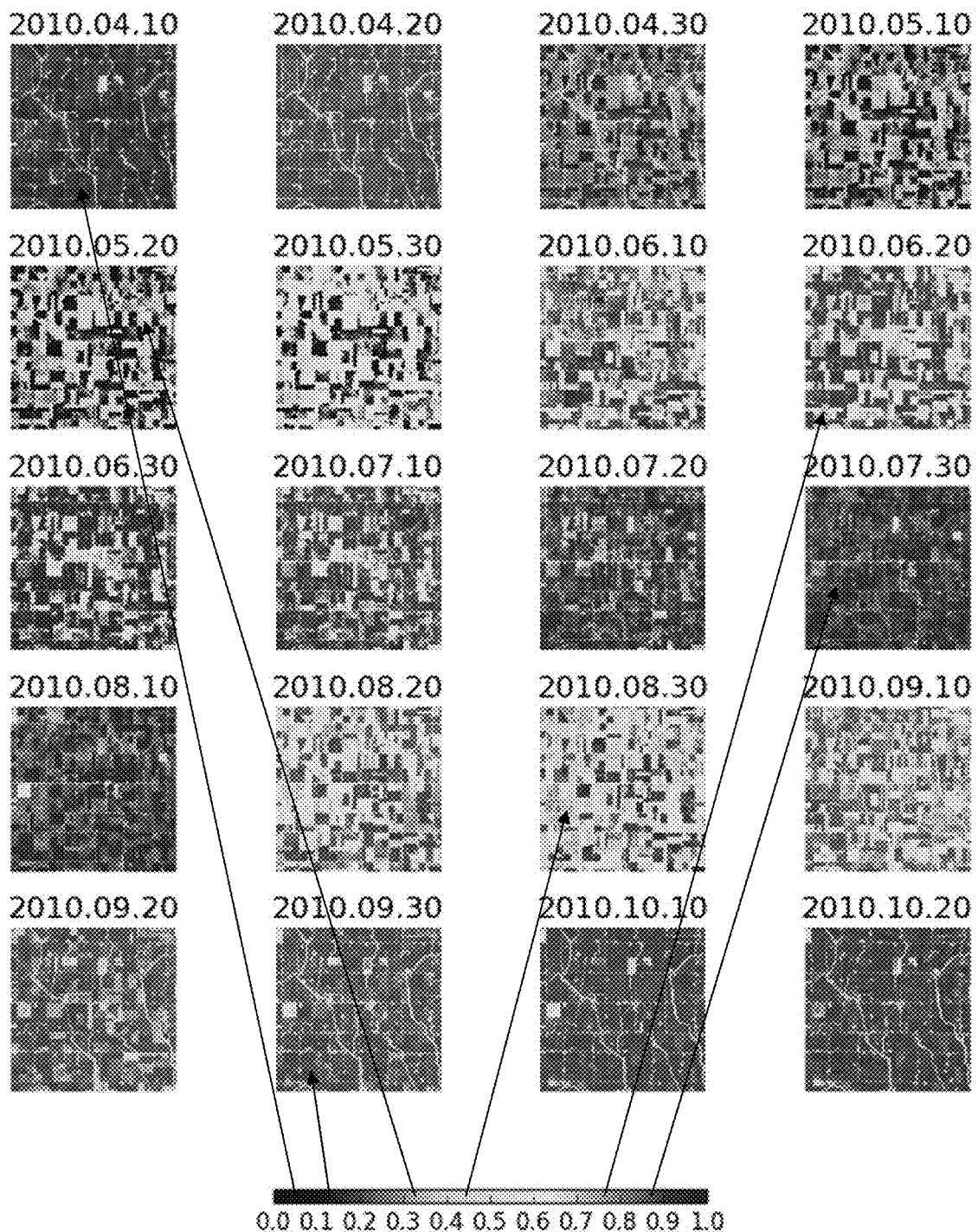
FIG. 7 depicts NDVI time series derived from fused images of a fusion method according to an embodiment. A subarea (north of Champaign County, IL) was selected to compute the NDVI values from Apr. 10, 2010, to Oct. 20, 2010, covering the growing season.
Figure 8:
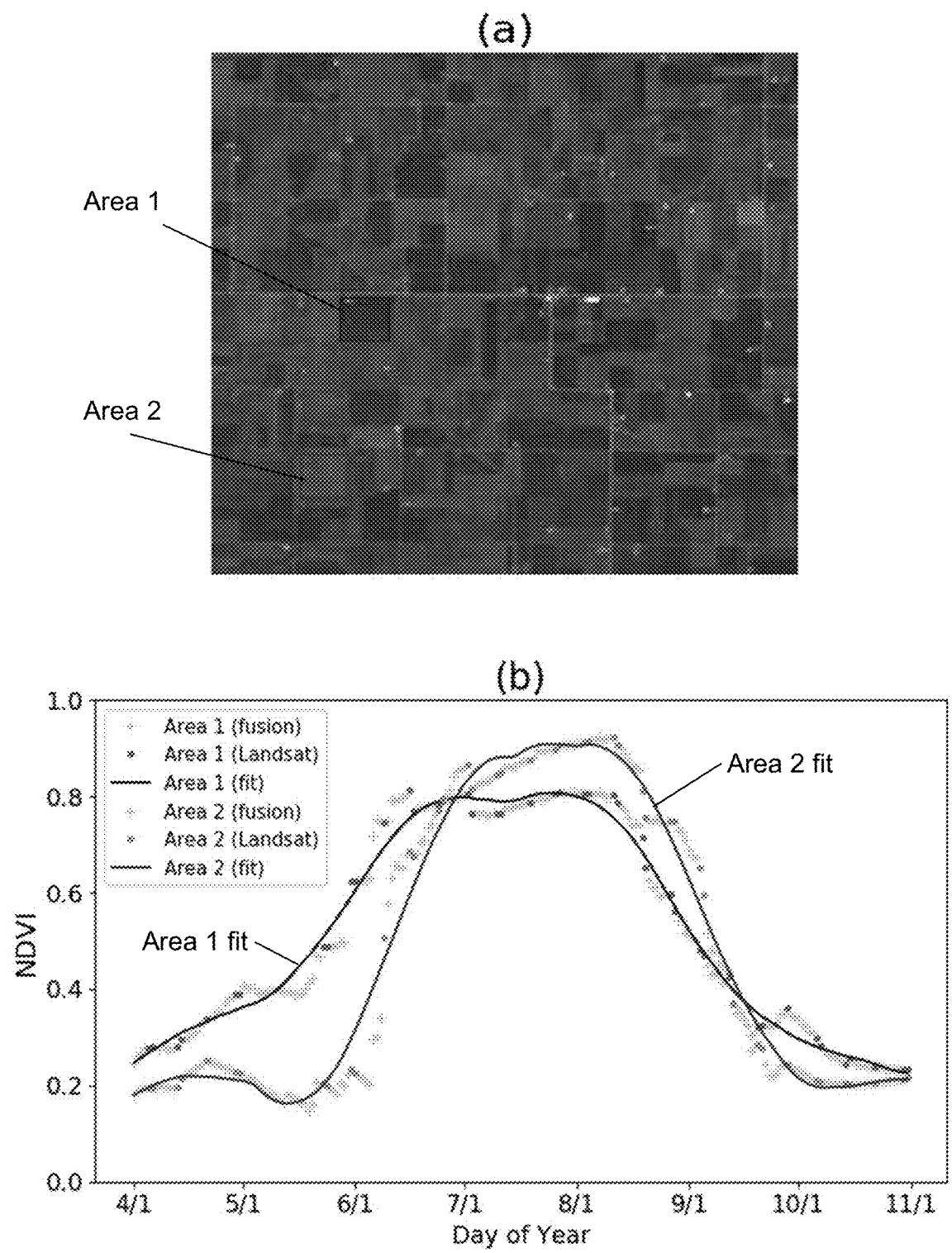
FIGS. 8a-b depict an embodiment of temporal patterns of NDVI.

Accurate prediction of the magnitude of pixel values in the fused images greatly benefits the downstream analysis that relies on accurate reflectance values. For example, normalized difference vegetation index (NDVI), which is calculated based on the surface reflectance values of red and nir bands, are often used to monitor crop growth. The accurate prediction by the exemplary embodiments of surface reflectance at red and nir bands would lead to a more accurate NDVI, and thus enable a more reliable crop monitoring. As an example, daily NDVI images were built via the exemplary embodiments at 30 m resolution for a subarea in the north of Champaign county. FIG. 7 shows a subset of these images for every ten days from April 10 to October 20 in 2010. The changing trends of NDVI at field level can be easily tracked in the NDVI images. We further selected two regions with different types of land cover in this area and computed their NDVI time series as illustrated in FIGS. 8a-b. The different temporal patterns of the two regions can be easily identified from the fitted curves of the fusion results of the exemplary method. These examples showed the potential of the exemplary method for being used in downstream applications, such as quantitative analysis of crop growth.

The above results of experiments demonstrated the superior ability of the exemplary fusion method, which simultaneously better captures the texture patterns and more accurately predicts the surface reflectance values that are closer to the ground truth. The exemplary method thus provides a high-quality synthetic product with both high spatial and high temporal resolutions, which will benefit other remote sensing based analysis.

Compared to previous methods (e.g., STARFM) for Landsat-MODIS fusion, the exemplary method (e.g., STAIR) has achieved several advances. Some of the more significant improvements of the exemplary method are its flexibility and convenience of usage. Previous Landsat-MODIS fusion methods, including STARFM and ESTARFM, require users to manually select the most proper input Landsat-MODIS pairs (at most two pairs) and specify them as the input of the fusion method. In contrast, when using a certain exemplary method, users only need to simply provide a certain exemplary algorithm with time series of all the available Landsat and MODIS data and do not have to identify pairs for fusion. This exemplary method will then integrate the information in the multiple input pairs, automatically decide which pairs are the most informative, and fuse a fine-resolution image for each of the target dates. The whole pipeline of this exemplary method minimizes the human effort and frees users from the tedious process of selecting input pairs, thus it serves as an easy-to-use tool in practice.

Additionally, a certain exemplary method also enables a certain exemplary algorithm to take the full advantage of more available information and produce high-quality fusion products. This exemplary method is able to integrate a time series of satellite data that consists of any number of Landsat-MODIS image pairs for data fusion, while the STARFM algorithm can take at most two pairs of Landsat and MODIS images as input. As found in the experiments, STARFM often failed to fuse image pixels if the corresponding area was missing (e.g., cloud-contaminated or un-scanned) in both of the two input image pairs. In this case, these pixels remained as missing values in the output image of STARFM. In contrast, by integrating more pairs of Landsat-MODIS image pairs, this exemplary method can iteratively fuse the missing pixels until all the pixels are filled.

Further, a certain exemplary method imputes missing pixels with high quality. As the quality and use of satellite images are often hampered by the cloudy pixels, unscanned pixels and systematic bias, the imputation of missing pixels and the value-correction of imputed pixels are pressingly needed for the fusion products. This exemplary adaptive imputation approach fills missing values in an image by first separating different land covers using an automatic semantic segmentation, and then imputing missing pixels using a locally linear interpolation and a neighborhood correction. The high-quality missing-pixel imputation not only facilitates the fusion process, but also serves as a useful stand-alone tool for other remote sensing based analysis.

A certain exemplary fusion method is a generic framework in that it can fuse multiple types of satellite data. Although the example of the method was shown on integrating two types of satellite imageries (Landsat and MODIS), the method can be easily extended to further incorporate other types of data. For example, Landsat and MODIS images can first be fused as described herein, and then this synthetic product can be fused with a third satellite imagery, e.g., Sentinel-2, using another run of the exemplary method. For example, cross geo-registration and spectral alignments between different data can be utilized before this step as described herein. This iterative integration approach of multiple satellite imageries may only require little modification to the exemplary method discussed above.

Also, multiple options exist of involving more data sources in the exemplary fusion approach. For coarse-resolution satellite data, besides MODIS, VIIRS on board of NASA Suomi-NPP satellite provides a continuation of the MODIS mission (Cao et al., 2013). ESA's Proba-V also provides daily and coarse-resolution data (300 m-1 km) for the similar spectral bands as Landsat (Dierckx et al., 2014). The new generations of geostationary satellite data, e.g., JAXA's Himawari-9 (Bessho et al., 2016), ESA's MSG (Schmetz et al., 2014) and the newly launched NOAA's GOES-R (Schmit et al., 2005), provides sub-hourly satellite data with much more spectral bands similar to MODIS and Landsat (which were not the case for prior generations of geostationary weather satellites). For medium-/high-resolution satellite data, the Landsat mission will continue with expected Landsat 9 planned to launch on 2020 (Loveland & Dwyer, 2012); and availability of Sentinel-2 A and B will further increase the sample frequency (though their sampling frequency varies in geographical locations) and also increase the spatial resolution down to 10 m for some spectral bands (Drusch et al., 2012). Though more availability of medium-/high-resolution satellite data can reduce sampling gaps for tropical or cloudy regions, it is not expected that daily sampling at 10-30 m resolution becomes possible in the short-term for public satellite data, which justifies the continuous use of the fusion approaches to get daily and high-resolution images.

Various exemplary methods can also utilize unifying spectral responses, cross geo-registration, and/or sun-sensor angle correction. First, each satellite dataset may have a different coverage of spectral ranges for a certain band, and properly unifying the spectral responses can be a prerequisite before data fusion. For example, MODIS's NIR band cover 841-876 nm, Landsat 7 ETM+ covers 770-900 nm, and Landsat 8 OLI covers 851-879 nm. Previous studies indicate that surface reflectance values of MODIS and Landsat ETM+ are generally consistent (Masek et al., 2006; Claverie et al., 2015), and spectral responses between ETM+ and OLI are also close enough to be used as a consistent product (Flood 2014; Li et al., 2013). In one or more examples, it was assumed based on STARFM that the spectral responses for MODIS, ETM+ and OLI are sufficiently close to be used for fusion purpose, though it is acknowledged that biases in the cross-sensor spectral responses exist. When fusing Sentinel-2 or other optical satellite data together with MODIS and Landsat, a unification of cross-sensor spectral responses may be conducted before fusion (Claverie et al., 2016). Second, cross geo-registration can be utilized and can be critical for successful data fusion. Each satellite dataset has their own inherent uncertain of geolocations, and geolocation errors also exist between sensors, all of which can propagate to the fusion process. This issue becomes more notable when fusing two high-resolution satellite data (Storey 2016). For example, it has been found that Landsat and Sentinel-2 are currently misaligned by several 10 m pixels (Storey 2016). Robust and automated methods for cross-geo-registration can be required for any scaled fusion production, for example, through image texture/spectral matching (Yan et al., 2016). Third, sun-sensor angle correction can require careful attention and preprocessing. Most high-/medium resolution satellite data are captured from the nadir view (Roy et al., 2016); however, coarse-resolution satellite data usually can have a large variation of viewing angle within a scene due to the large swath coverage. Correcting the BRDF effects for coarse-resolution data can thus be necessary before any fusion work (Gao et al., 2006).

A certain exemplary method was implemented in a way such that most of the main steps (such as the imputation of missing-value pixels and the interpolation of Landsat-MODIS) were computed using highly optimized matrix operations, which makes the whole pipeline more computationally efficient than that implemented with pixel-wise operations. In addition, this exemplary method can be run in a parallel manner. For example, on local benchmarks, the Champaign County was split into 20 subareas with roughly equal size. This exemplary method was then applied on each of the subareas simultaneously, and subsequently merged were the fusion results of each subarea to obtain a full fused image of Champaign County. This exemplary method took less than 30 minutes to generate a product containing daily, 30 m resolution images for Champaign County, covering the growing season of one year. This "divide and conquer" framework also enabled handling satellite data for larger areas at a continental-scale for operational production, with an only reasonable requirement of running time and memory usage. This exemplary method can be implemented in various computer instructions such as currently in Python and running on CPUs only. However, it can be translated into a C/C++ version and parallelized onto GPUs, which would further provide orders of magnitude of acceleration.

There has been an emergence and increased availability of satellite datasets with both high resolutions in space and time from the commercial world (e.g., Planet Labs). However, various exemplary fusion methods can play critical roles in the future satellite earth observation. First, it is believed that previous and current fusion methods typically rely on public and free satellite data, thus the overall cost of generating fused data with both high spatial resolution and high frequency typically only requires computation cost, which is low for any scaled production. While the industry is still in the phase of promising a daily high-resolution product for the near future, an exemplary fusion method has already generated such a daily product as described above. Second, scientific values of the fusion data are usually much higher and have gone through more rigorous preprocessing. Specifically, the promised daily image products from the industry usually have limited spectral bands (e.g., visible), and radiance calibration and atmospheric corrections are either lacking or less strictly done, which significantly limits the scientific and more rigorous uses of those satellite images. While the fusion products are based on NASA and ESA's satellite data that has gone through strict scientific preprocessing and can be directly used in both applications and scientific explorations. Third, an exemplary fusion method allows taking advantage of the rich archives of historical NASA satellite data, and enables generating historical daily, 30 m, cloud-/gap-free images for any (or most) places on the planet for the past decades (e.g., since 2000 when MODIS data became available); various exemplary fusion methods described herein can enable generation of such images. These historical fusion data open up opportunities to detect past changes and long-term trends for terrestrial ecosystems and urban areas, and most importantly they allow the possibility to combine with other historical data sources (e.g., statistical survey, observation network) to train advanced models and machine learning algorithms to infer societally meaningful information (e.g., crop yield, economic indicators). With more availability of the public satellite data from NASA, ESA and international community, the fusion products integrating multiple sources would continuously be improved.

Figure 11:
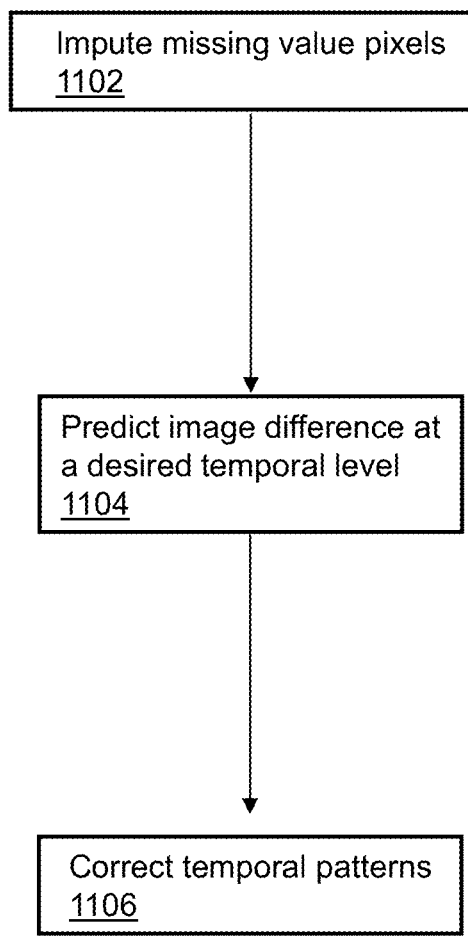
FIG. 11 depicts an illustrative fusion method according to an embodiment.

Referring to FIG. 11, a method 1100 is illustrated for a method to fuse multiple sources of optical satellite data to generate a high-resolution, high temporal frequency and cloud-/gap-free surface reflectance product. At 1102, a gap filling technique can be applied to one or more of the images. As an example, the gap filling can be a global average correction approach, an adaptive-average correction approach or another type of technique that imputes missing pixel values to images. For instance, method can first partition a particular image into multiple segments, in which each segment contains one type of homogeneous pixels. Missing-value pixels can be imputed separately in each segment, using an adaptive-average correction process that is based on a locally linear interpolation and a neighborhood correction. This can be performed for any number of images that require or desire correction.

At 1104, a time series of image pairs can be taken as input (e.g., Landsat-MODIS). This exemplary embodiment can model and predict the Landsat-MODIS difference at a corresponding temporal level (e.g., daily), capturing fine-resolution spatial information. At 1106, the input daily time series of MODIS data can then be used to further correct the temporal patterns in the predicted time series of Landsat-MODIS difference, generating daily time series of predicted images.

As described herein, remote sensing datasets with both high spatial and high temporal resolution are critical for monitoring and modeling the dynamics of land surfaces. Unfortunately, most of the currently available satellite missions have to live with the tradeoff between acquisition frequency and spatial resolution, and no single satellite sensor could simultaneously achieve both high spatial resolution and high revisiting frequency. Therefore, the integration of different sources of satellite data to produce a fusion product has become a popular solution to address this challenge. Many methods have been proposed to generate synthetic images with rich spatial details and high temporal frequency by combining two types of satellite datasets—usually frequent coarse-resolution images (e.g., MODIS) and sparse fine-resolution images (e.g., Landsat). As described herein is another embodiment (sometimes referred to as STAIR 2.0). In various examples, STAIR 2.0 provides a new fusion method that extends the STAIR fusion framework, to fuse three types of satellite datasets, including MODIS time series, Landsat time series, and Sentinel-2 time series. In STAIR 2.0, images in each input time series are first processed to impute missing-value pixels that are due to clouds, saturation values, and/or sensor mechanic issues (e.g., Landsat 7 un-scanned strips), using an adaptive neighborhood-correction gap filling algorithm. The multiple refined time series (e.g., MODIS time series, Landsat time series, and Sentinel-2 time series) are then integrated together by an stepwise strategy, from coarse resolution to fine resolution and to high resolution, ultimately providing, for example, a synthetic surface reflectance product with 10 m spatial resolution and daily temporal frequency. STAIR 2.0 has been applied to generate a time series that covers the growing season (April 1-November 1) for Saunders County at Nebraska, 2017, in which missing-value pixels such as cloud regions were effectively removed and filled and the temporal dynamics were captured by the generated dense time series. The STAIR 2.0 framework is computationally optimized and scalable to produce (for example) daily, 10 m resolution surface reflectance product at continental scales. Moreover, the framework is generic and more types of satellite data sources can be easily integrated to further improve the quality of the fusion product.

The STAIR 2.0 embodiments can be viewed as an extension of the STAIR algorithm (Luo et al., 2018). As described herein, STAIR is a recently developed, generic and fully-automated method for fusing multi-spectral satellite data to generate high-frequency, high-resolution and cloud-/gap-free data. Luo et al. (2018) has demonstrated STAIR's advanced performance in fusing Landsat and MODIS data to generate 30 meter and daily surface reflectance data for a large agricultural landscape. As described herein, an example of STAIR 2.0 provides a framework to fuse three satellite data sources (namely Landsat, MODIS, and Sentinel-2), to generate 10 meter and daily surface reflectance data. This provides a demonstration of the STAIR algorithm's nature of generic and flexibility to fuse all sorts of optical satellite data after the proper pre-processing.

Reference will now be made to certain Materials and Methods associated with an example of the STAIR 2.0 embodiment. In particular, reference will now be made to a certain example Dataset according to an embodiment. As described herein is an example, in which the aim is to build a fusion dataset using MODIS, Landsat and Sentinel-2 images of Saunders, NE, in 2017 to evaluate the performance of STAIR 2.0. To perform a comprehensive evaluation to assess the ability of the method under different conditions (e.g., time points and satellite sensors), the MODIS, Landsat and Sentinel-2 images in the dataset were selected to cover a wide temporal range, i.e. growing seasons (April 1-November 1), and cover six spectral bands (i.e. red, green, blue, nir, swir1, and swir2). Specifically, collected were surface reflectance data of all the Landsat data covering this period (i.e. Landsat-5 TM, Landsat-7 ETM+, Landsat-8 OLI) (Masek et al., 2006; Roy et al., 2014), MODIS MCD43A4 Nadir BRDF-Adjusted Surface Reflectance (NBAR) products (Schaaf et al., 2002; Wang et al., 2014), Sentinel-2A and Sentinel-2B Level 1C products for the year 2017 that cover Saunders, NE. The three Landsat products all have the 30 m spatial resolution but low temporal resolution (16-day revisit cycle), and are often cloud-contaminated. While the MODIS product has a more frequent revisit cycle (daily) but a coarse spatial resolution (500 m). The Sentinel product has a 20-day revisiting frequency, and the spatial resolution is 10 m for the rgb and nir bands and 20 m for swir1 and swir2 bands. Further, used is the Sen2Cor processor (Louis et al., 2016) to perform the atmospheric, terrain and cirrus correction of Sentinel-2 Level 1C products, which also resamples the swir1 and swir2 bands to 10 m resolution. Both Landsat and MODIS surface reflectance data have gone through radiance calibration and atmospheric corrections and only clear-day pixels are used, i.e., the fmask algorithm (Zhu & Woodcock, 2012) is applied to Landsat to remove cloudy pixels, and only "good quality" flagged pixels in MODIS data are used for fusion. MODIS MCD43A4 data have also been adjusted and normalized to be nadir view at local solar noon time, using the BRDF correction (Strahler & Muller, 1999). The standard surface reflectance data of Landsat has not been BRDF-corrected, but due to the small field of view in Landsat (±7.5° from nadir), Landsat can be largely regarded as in nadir view (Gao et al., 2006). Excluded were scenes with the fraction of cloud pixels greater than 75%.

Still referring to Materials and Methods, reference will now be made to a certain example Data preprocessing according to an embodiment. In particular, reference will now be made to a certain example Spatial co-registration according to an embodiment. To correct the spatial shifts existing in MODIS, Landsat and Sentinel-2 images, Landsat images were used as the reference and spatial co-registration was performed to correct the pixel coordinates of MODIS and Sentinel-2 images. Due to the difference of spatial resolutions, different registration approaches were used for MODIS-Landsat and for Sentinel-Landsat.

Each Landsat-MODIS matching pair (acquired on the same day) was co-registered by first shifting the Landsat image by up to 20 pixels (since one MODIS pixel approximately corresponds to one 17*17 Landsat pixel) in each of the four cardinals and four ordinal directions. The optimal offset that maximizes the correlation between the Landsat and MODIS images was then used to co-register the Landsat-MODIS pair.

An algorithm based on tie point detection was used to perform spatial co-registration between Landsat and Sentinel 2 images. A Scale-Invariant Feature Transform (SIFT) (Lowe, 1999) was used to find image keypoints in Landsat and Sentinel 2 images (see U.S. Pat. No. 6,711,293). For each key point on the Landsat image, a search was made for potential matching key points in the Sentinel 2 image. The matching criteria for the key points include: 1) close pixel distance and 2) similar corner orientation. The matchings are used to fit a transformation of geolocation. In this step, any one of three methods can be used: 1) assume a constant offset vector across the image and derive it by averaging over the shift vector of all matching key point pairs; 2) smoothing the spatial variance of shift vectors of the matching key points, and perform a 2D interpolation of the shift vector to generate a offset map; 3) assume affine transformation and fit the following transform using all matching key point pairs $$d(\hat{p}) = w\hat{p} + \hat{r}$$

where $\hat{p}$ is the position on the image; $d(\hat{p})$ is the offset vector at $\hat{p}$, w is a 2 by 2 weight matrix, and $\hat{r}$ is an offset vector. w and $\hat{r}$ are the fitted values. Finally, the offset map generated by either one of the three methods are applied to the Sentinel 2 image, completing Landsat-Sentinel geometric calibration. In another example, SIFT can be replaced by the maximizing-correlation method mentioned above in connection with Landsat-MODIS co-registration.

Still referring to Data preprocessing, reference will now be made to a certain example Spectral adjustment according to an embodiment. It is necessary in this embodiment to perform the spectral adjustment of surface reflectance values before the fusion step. There are small differences of wavelengths existing between equivalent spectral bands of Landsat and Sentinel-2 satellite sensors (see Table 1, below). For example, the central wavelengths of the blue band in MODIS, Landsat 5/7, Landsat 8, and Sentinel-2 are 469 nm, 477 nm, 482 nm, and 490 nm, respectively. Here, in this example, Landsat images are used as the reference and the MODIS and Sentinel-2 spectral bands are adjusted to it. First used is the regression model derived in a previous work (Roy et al., 2016) to transform the surface reflectance values of Landsat 5/7 to the comparable bands of Landsat 8. Then adopted is the approach used in a previous work (Claverie et al. 2018), which systematically collected Landsat and Sentinel scenes worldwide and built a linear regression model to adjust Sentinel-2 spectral bands to Landsat bands. Applied was the same technique to adjust the equivalent spectral bands of Landsat and MODIS datasets, and it was found that the differences between Landsat MODIS are negligible compared to the differences existing between Landsat and Sentinel-2.

TABLE 1

Band wavelengths (mm) of MODIS, Landsat 5/7/8, and Sentinel-2 satellite sensors

| Band | MODIS | Landsat 5/7 | Landsat 8 | Sentinel-2 |
|---|---|---|---|---|
| Blue | 459-479 | 441-514 | 452-512 | 458-523 |
| Green | 545-565 | 519-601 | 533-590 | 543-578 |
| Red | 620-670 | 631-692 | 636-673 | 650-680 |
| NIR | 841-876 | 772-898 | 851-879 | 785-900 |
| SWIR1 | 1,628-1,652 | 1,547-1,749 | 1,566-1,651 | 1,565-1,655 |
| SWIR2 | 2,105-2,155 | 2,064-2,345 | 2,107-2,294 | 2,100-2,280 |

Still referring to Materials and Methods, reference will now be made to a certain example Imputation of missing pixels according to an embodiment. MODIS, Landsat and Sentinel-2 images of frequently cloudy areas often have a large fraction of missing-value pixels masked out by the cloud mask and contain only a small portion of pixels with unmasked values. In addition, the utility of Landsat 7 SLC-off data was largely impacted by the spatial discontinuity imposed by the un-scanned gaps. The imputation of the cloudy and/or un-scanned pixels thus not only help recover the complete view of an optical satellite image but also facilitate downstream applications and analysis, such as data fusion of multiple satellite images.

As described herein according to an embodiment is an example approach for imputing the missing-value pixels due to un-scanned gaps and/or clouds in the MODIS/Landsat/Sentinel-2 images. As an overview, the gap-filling algorithm takes as input time series images of one type of satellite data and iteratively fills images in the time series that has missing pixels. At each iteration, two images are processed: an image with missing pixels (hereinafter referred to as target image) and a temporally close image which has valid non-missing pixel values (hereinafter referred to as reference image) at the missing regions in the target image. Missing pixels in the target image are first filled by the alternative pixels from the same land cover region in the reference image and then adjusted by a pixel-wise correction step, which improves the filling quality.

Still referring to Imputation of missing pixels, reference will now be made to a certain example Step 1: Segmentation of land covers according to an embodiment. A single satellite image often contains heterogeneous land cover types, and each type may exhibit a unique temporal changing trend in the time series. To take into account the different changing patterns of heterogeneous pixels, filled are the missing pixels of each land cover type separately in the target image. For this purpose, the reference image is first partitioned into multiple segments, where each segment contains the pixels corresponding to one type of homogeneous pixels. The gap-filling algorithm can automatically choose the number of segments that best describes the number of types of homogeneous pixels (e.g., number of types of land cover) in an image. Specifically, run is (for example) the k-means clustering algorithm (Lloyd, 1982) to partition the image into multiple segments, such that pixels of the same homogeneous type are grouped together. To automatically determine the number of segments (Na) that best explains the land cover heterogeneity in an image, used is an index called gap statistic derived in Tjbshirani et al. (2001), which quantifies the dispersion of the segmentation results of the image with respect to a null reference distribution (i.e., a random image with no obvious clustering). A higher gap statistic generally indicates a clustering result that better captures the group patterns in the data. In this example, run is the k-means clustering algorithm and computed is the gap statistic for the number of segments $N_s$ varying from 2 to 8. The segmentation result with the highest gap statistic value is selected as the optimal segmentation of the image. It is found that the optimal value of $N_s$ is mostly 2, 3 or 4 for the study area described herein. Since the target image has missing pixels, the segmentation process cannot be directly applied to the target image. However, given that the target image and the reference image are temporally close and it is unlikely to have rapid land cover changes in the short time frame, also applied are the segmentation results of the reference image to the target image.

Still referring to Imputation of missing pixels, reference will now be made to a certain example Step 2: Temporal interpolation through a linear regression according to an embodiment. One straightforward approach for filling the missing pixels in the target images is to use a linear regression method to interpolate the missing values in the target image based on the available values of the same areas in other temporarily close reference images. The rationale behind this approach is that, in a reasonably short time frame, the values of surface reflectance tend to change linearly. This property of local linearity enables one to derive the missing surface reflectance values in the target image by linearly interpolating the values of the reference image, where the surface reflectance of the same region is not missing. Since strips in Landsat 7 SLC-off images (or cloud regions) are generally offset in the time series over the same region, it is likely to find available gap-/cloud-free pixels in other dates that are temporarily close to the target image. This makes the linear interpolation a feasible approach for gap filling. Specifically, let $I(p_c,t_0)$ and $I(p_c,t_1)$ be the surface reflectance values of pixel $p_c$ of land cover class c in the reference image and the target image, respectively, then the temporal relationship between the two surface reflectance values can be modeled by a linear function:

$$I(p_c,t_1)=a_cI(p_c,t_0)+b_c,$$

where $a_c$ and $b_c$ are the linear regression parameters specific to land cover class c. To estimate parameters $a_c$ and $b_c$, we fit the linear function using all class-c pixels that are not located in missing-value regions from the target image and the reference image. The surface reflectance value of each pixel (including missing pixels and non-missing pixels) in the target image can then be filled as:

$$\hat{I}(p_c,t_1)=\hat{a}_cI(p_c,t_0)+\hat{b}_c,$$

where $\hat{a}$ and $\hat{b}$ are the estimated regression parameters, and $\hat{I}(p_c,t_1)$ is the predicted surface reflectance value of pixel $p_c$ in the target image.

Despite its simplicity and effectiveness, the linear interpolation based approach does not always give the accurate filling results of the missing pixels, possibly because: i) the time series of surface reflectance may change rapidly in some time frame throughout the year and thus loses the local linearity, and/or ii) the systematic bias of the reference images may lead to inaccurate linear interpolation, causing the derived values of missing-value pixels in the target images to be over- or under-estimated. To produce high-quality gap-filled images as input for the fusion algorithms described herein, however, the magnitude of filled pixel values should match that of the original pixel values out of non-missing pixels, without displaying visually noticeable stripes or cloud shapes. A key observation is that although being inharmonic with the original pixels out of the gaps, the filled pixels have captured the correct texture patterns. Therefore, the biased color scale of the filled pixels is corrected using a neighborhood correction method.

Still referring to Imputation of missing pixels, reference will now be made to a certain example Step 3: Adaptive-average correction with similar neighborhood pixels according to an embodiment. The rationale behind the neighborhood correction method for missing-pixel filling is that the relative relationship between a pixel and a neighborhood pixel of it remains roughly the same across different dates in the time series of satellite images, especially in a short time frame. For example, let $\hat{I}(p_c,t_1)$ be the predicted surface reflectance value (described above) at pixel $p_c$ of land cover class c in the un-scanned SLC strips or cloud regions in the target image at date $t_1$, and $\hat{I}(q_c,t_1)$ be the predicted value at a pixel $q_c$ of the same land cover class in the target image, which is a neighborhood pixel of $p_c$ and out of the strips or cloud regions. Similarly, let $I(p_c,t_0)$ and $I(q_c,t_0)$ be the actual values of pixels on the same positions in the gap-/cloud-free reference image at another date $t_0$. Note that here $I(p_c,t_0)$ is not a missing value. The assumption is that if the two dates $t_0$ and $t_1$ are within a short time frame (e.g., less than 2-3 weeks), the relative relationship between pixels $p_c$ and $q_c$ will remain roughly the same. That is, $$I(p_c,t_0)-I(q_c,t_0)\approx\hat{I}(q_c,t_1)-\hat{I}(q_c,t_1).$$

Or equivalently, $$\delta(p_c)\approx\delta(q_c),$$

where $\delta(p_c)=I(p_c,t_0)-\hat{I}(p_c,t_1)$ and $\delta(q_c)=I(q_c,t_0)-\hat{I}(q_c,t_1)$ are the prediction residuals of pixels $p_c$ and $q_c$, respectively.

Based on this assumption, first computed can be the prediction residuals of a clear pixel $q_c$ outside the strips or cloud regions and this residual can be used to correct the filled value at pixel $p_c$ derived by the linear regression model:

$$I^*(p_c,t_0)=\hat{I}(p_c,t_0)+\delta(p_c)\approx\hat{I}(p_c,t_0)+\delta(q_c)$$

To make the correction more robust and reliable, do not correct the filled value using the residual of only one pixel. Instead, calculate the weighted average of prediction residuals of a set of "similar neighborhood pixels" of pixel $p_c$:

$$\delta^*(p_c)=\Sigma_{q_c\in N(p_c)}w_{q_c}\delta(q_c),$$

where $N(p_c)$ is the set of similar neighborhood pixels of pixel $p_c$ and $w_{q_c}$ is the weight that quantifies the importance of each neighborhood pixel $q_c$ in computing the weighted average of prediction residuals. The identification of similar neighborhood pixels and the determination of average weights are described in the next step. Given the weighted average of prediction residuals, the final correction of the filled pixel $p_c$ is computed as $$I^*(p_c,t_0)=\hat{I}(p_c,t_0)+\delta^*(p_c).$$

This approach is referred to as "imputation with adaptive-average correction" as it adaptively finds similar neighborhood pixels of the corresponding land covers to correct the filled value of the filled pixel.

Still referring to Imputation of missing pixels, reference will now be made to a certain example Step 4: The search of similar neighborhood pixels according to an embodiment. As described above, to correct a filled value $\hat{I}(p_c,t_0)$, searched is a set of "similar neighborhood pixels", i.e., pixels that are spatially close to pixel $p_c$ and have similar temporal changing patterns in the time series. The neighborhood region is defined (in this example) as a window of 31×31 pixels centered on pixel $p_c$, and all pixels of the same land cover class c in this window are considered as candidate pixels. The goal of this example is to find pixels that not only have similar spectral value on date $t_0$ but also share similar temporal changing pattern across the time series. Therefore, the similarity of two pixels is defined as the cosine similarity of their surface reflectance profiles. For example, the surface reflectance profile x(p) of pixel p is a vector composed of all surface reflectance values of pixel p in the time series $[I(p,t_0), I(p,t_1), \ldots, I(p,t_n)]$, where n is the number of available images. The pairwise cosine similarity between pixel $p_c$ and each candidate pixel $q_c$ is then computed:

$$s(p_c, q_c) = \frac{\sum_{i=1}^{n} I(p_c, t_i)I(q_c, t_i)}{\sqrt{\sum_{i=1}^{n} I(p_c, t_i)^2} \sqrt{\sum_{i=1}^{n} I(q, t_i)^2}}$$

in which ignored are surface reflectance values that are missing-value in the summations. The profile similarity is a value in [0, 1], and a larger value suggests the two pixels have similar temporal changing patterns in the time series.

From the candidate pixels, selected are the top 20 pixels that have the largest profile similarity with pixel $p_c$ as the similar neighborhood pixels. The weight of each selected pixel in computing the weighted average is defined as $w_{q_c}=1/d(p_c,q_c)$, where $d(p_c,q_c)$ is the Euclidean pixel distance between pixels $p_c$ and $q_c$. Then computed is the weighted average of prediction residuals $\delta^*(p_c)$ as described in the previous step to apply the adaptive-average correction.

The search of similar neighborhood pixels requires exhaustively computing all pairwise similarities between pixel $p_c$ and every candidate pixel $q_c$, which could lead to a long running time. To accelerate this process, implemented (in this example) is a multiprocessing searching algorithm that splits the candidate pixels into multiple groups and computes the pairwise similarity in parallel on multiple CPU cores. It has been found that using 20 CPU cores can speed up the step of similar pixel searching by 20 times.

Still referring to Imputation of missing pixels, reference will now be made to a certain example Step 5: Iterative imputation using multiple reference images according to an embodiment. For a target image, sorted are other images in the time-series in the ascending order of their temporal distance to the target image, and used are each of the sorted images as the reference image to iteratively fill the missing pixels in the target image, where each iteration is a repetition of the aforementioned steps.

In this example, to reduce the memory usage during the missing-pixel imputation, the whole input image is partitioned into small patches of 200×200 pixels, the imputation algorithm is applied on each of the patches, and all patches are merged together after the missing-pixel imputation.

Still referring to Materials and Methods, reference will now be made to a certain example Fusion of multiple sources of optical satellite data according to an embodiment. As described herein is an example fusion framework that fuses multiple sources of optical satellite data (see, e.g., FIG. 12). After the imputation of missing pixels for each of the satellite data sources as described above, used is a stepwise strategy to fuse multiple satellite data from coarse resolution to fine resolution. As described herein according to an embodiment is generation of a daily fusion product with 10 m resolution using MODIS (500 m), Landsat (30 m) and Sentinel-2 (10 m) images: first generate daily fusion images of 30 m resolution using MODIS and Landsat data, and then fuse the Sentinel-2 data and the MODIS-Landsat synthetic data to generate a fusion product of 10 m resolution. Details of the fusion framework of this example are described below.

Still referring to Fusion of multiple sources of optical satellite data, reference will now be made to a certain example Fusion of MOMS and Landsat data according to an embodiment. In the first step of this example, integrated are Landsat and MODIS data into a synthetic product with both high spatial (30 m) and high temporal (daily) resolutions. Taking the time series of Landsat and MODIS images observed on matching days as input, the algorithm of this example captures the fine-grained information provided by Landsat images, and utilizes the daily MODIS images to further correct the temporal changing patterns in the predicted time series of images. Certain previous fusion algorithms (e.g., STARFM (Gao et al., 2006)) can take only one or two Landsat-MODIS pairs as input at a time, or process multiple pairs in a time-consuming, pair-by-pair way with user's manual selection, in which the information used to fuse the target image is often limited to the one or two input pairs. In contrast, the algorithm of this example can process a time series that consists of a much larger number of Landsat-MODIS pairs (e.g., a time series of images that covers the growing season in a year), fully exploit the spatial and temporal information in the time series, and minimize the user's effort.

A goal of the fusion framework of this example is to fuse Landsat and MODIS data into images with both high-resolution spatial information and frequent temporal coverage for n dates $t_i$ (i=1, 2, ..., n), and there are k matching pairs of Landsat and MODIS images that were acquired on the same dates $T_j$ (j=1, 2, ..., k) among the n dates (note that certain previous methods such as STARFM only supports k=1 or 2). Here, it is assumed the MODIS image M has been aligned and super-sampled to the resolution and bounds of the Landsat image L, and hence has the same image size, pixel resolution and projected coordinate system. The MODIS data $M(x,y,t_i)$ is also available for each date $t_i$ (i=1, 2, ..., n) where there will be prediction of the fine-resolution image.

Specifically, consider one Landsat image L and one MODIS image M that are acquired on the same date $T_j$, the relationship for a homogeneous pixel between the Landsat image and the MODIS image can be modeled as $$L(x,y,T_j)=M(x,y,T_j)+\epsilon(x,y,T_j),$$

where (x,y) is the location of the aligned pixel of Landsat and MODIS data, $T_j$ is the acquisition date for Landsat and MODIS data, and $\epsilon(x,y,T_j)$ is the difference between Landsat and MODIS data of position (x,y), due to measurement errors, solar/viewing angle geometry, noise and/or systematic biases (Zhu et al., 2010). Suppose the aim is to predict a fine-resolution image on date $t_p$ where only the MODIS data $M(x,y,t_p)$ is available but the Landsat data is unknown. The predicted image $F(x,y,t_p)$ can be represented as $F(x,y,t_p)=M(x,y,t_p)+\Delta(x,y,t_p)$, where $\Delta(x,y,t_p)$ is the difference between the MODIS image M and the predicted fine-resolution image F of position (x,y) at date. To obtain the difference $\Delta(x,y,t_p)$ of each position (x,y) at date $t_i$ for which it is desired to predict the fine-resolution image, integrate all the k available matching pairs of Landsat and MODIS data on dates from $T_1$ to $T_k$, and calculate the accurate difference between Landsat and MODIS data for each date $T_j$ (j=1, . . . , k) as follows $\epsilon(x,y,T_j)=L(x,y,T_j)-M(x,y,T_j)$.

Then linearly interpolate the difference $\epsilon(x,y,T_j)$ into each date $t_i$ for which it is desired to predict a fine-resolution image, and hence obtain an estimated difference $\Delta(x,y,t_i)$ for all positions (x,y) each date $t_i$. Intuitively, the estimates $\Delta(x,y,t_i)$ of image differences capture the most informative and high-resolution spatial information provided by Landsat data. To obtain the prediction of the fine-resolution image $F(x,y,t_i)$, use MODIS data to further correct the spatial information encoded in $\Delta(x,y,t_i)$ as follows $F(x,y,t_i)=M(x,y,t_i)+\Delta(x,y,t_i)$.

This step can be thought of as an adjustment step that incorporates the high-frequency temporal patterns provided by MODIS data. The predicted images $F(x,y,t_i)$ (i=1, 2, . . . , n) thus capture both high-resolution spatial and temporal information.

Still referring to Fusion of multiple sources of optical satellite data, reference will now be made to a certain example Fusion of Sentinel-2 and synthetic MODIS-Landsat data according to an embodiment. In the previous step of this example, obtained was a synthetic MODIS-Landsat product that has the daily temporal resolution and 30 m spatial resolution. In the current step, this product is further fused with Sentinel-2 imagery to generate a daily, 10 m fusion product. The fusion process is very similar to the fusion of MODIS and Landsat, except that here Sentinel-2 data is used as the high-resolution image input (10 m) and the synthetic MODIS-Landsat data is the low-resolution image input (30 m). Resampled was the 30 m synthetic MODIS-Landsat images to 10 m resolution and then estimated was the pixel difference $\Delta(x,y,t_i)$ for all positions (x,y) of the Sentinel 2 image $S(x,y,t_i)$ and the synthetic MODIS-Landsat image $F(x,y,t_i)$ at date $t_i$. The final fusion image $P(x,y,t_i)$ is obtained by computing $P(x,y,t_i)=F(x,y,t_i)+\Delta(x,y,t_i)$.

The final fusion product of this example contains daily, 10 m-resolution images.

Reference will now be made to certain Results associated with an example of the STAIR 2.0 embodiment. As described herein, demonstrated has been the applicability of STAIR 2.0 by applying it to the study area Saunders County, NE in 2017 to produce a fusion product. Taking daily MODIS time series and sparsely available Landsat and Sentinel-2 images (see, e.g., FIGS. 13 (a)-(i)) as input, STAIR 2.0 generates a surface reflectance product with (for example) both high spatial resolution (10 m) and high temporal resolution (daily). The product contains high-quality time series that covers the growing season (from April 1 to October 30). Images in the time series are cloud-/gap-free. Missing-value pixels that are due to Landsat 7 un-scanned strips (see, e.g., FIG. 13(d)) and clouds (see, e.g., FIG. 13(f)) were filled accurately and effectively by the imputation process. Using a stepwise fusion strategy, STAIR 2.0 first combines the MODIS and Landsat datasets to generate an intermediate fusion product which contains daily, 30 m-resolution time series (see, e.g., FIGS. 13(j)-(l)). This MODIS-Landsat fusion product was then upsampled to 10 m resolution and fused with the Sentinel-2 dataset, resulting in a fusion product that contains a time series cloud-/gap-free images with 10 m resolution and daily frequency.

Figure 12:
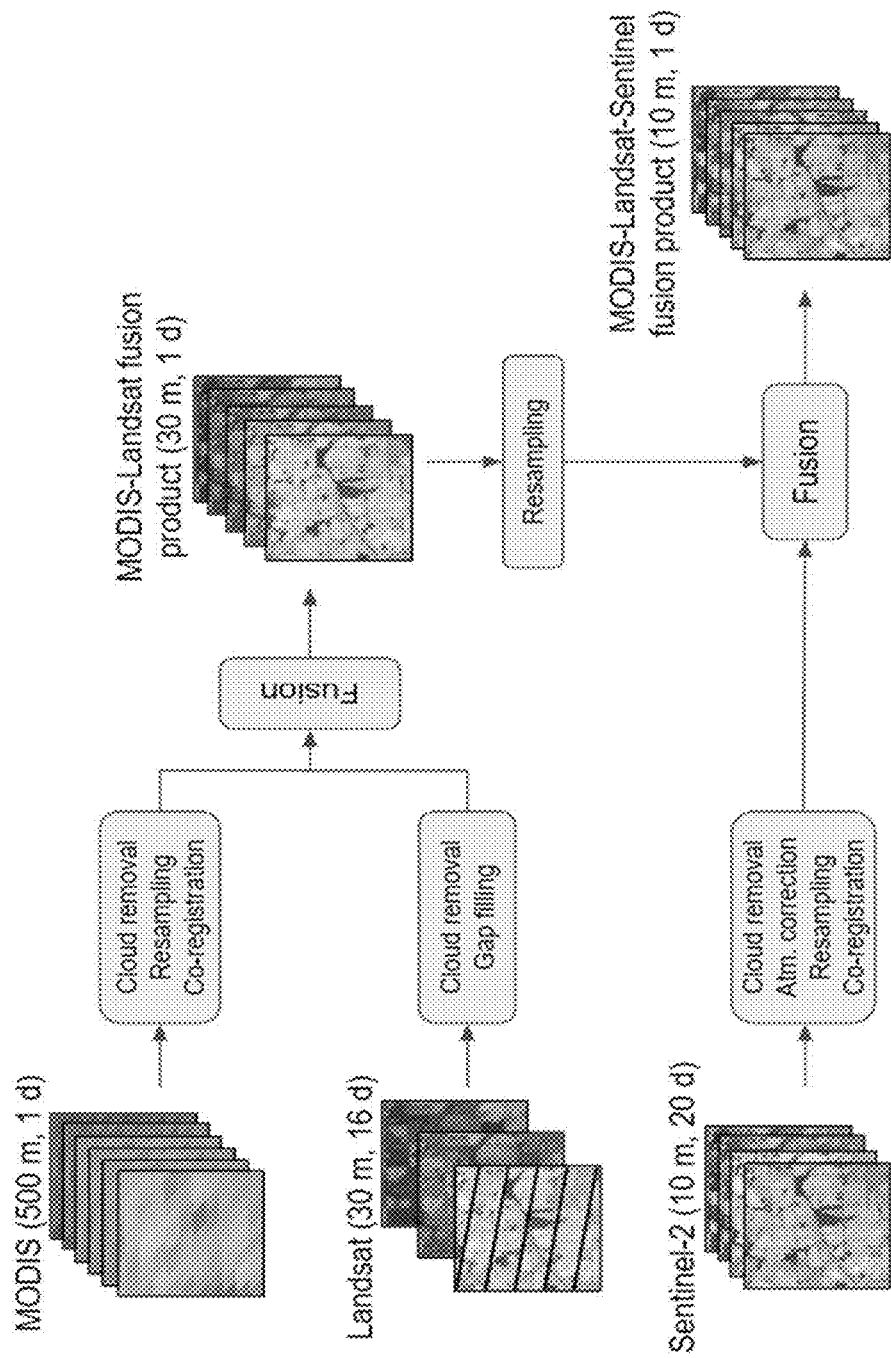
FIG. 12 depicts a schematic overview of a fusion method of a STAIR 2.0 embodiment.

Referring now in particular to FIG. 12, this depicts a schematic overview of a fusion method of a STAIR 2.0 embodiment. This STAIR 2.0 embodiment is a generic framework that can fuse multiple sources of optical satellite data and produce a high-resolution, daily and cloud-/gap-free surface reflectance product. The input of STAIR 2.0 are multiple sources of optical satellite data with different spatial and temporal resolution, e.g., MODIS (500 m, 1 day), Landsat (30 m, 16 day), and Sentinel-2 (10 m, 20 day). After the preprocessing of each dataset, including atmospheric correction, co-registration, resampling, STAIR 2.0 imputes missing-value pixels that are due to clouds or Landsat 7 un-scanned gaps in the images. Next, STAIR 2.0 uses a stepwise strategy—from coarse resolution to fine resolution—to produce a high spatial- and temporal-resolution product: MODIS and Landsat datasets are first fused to generate a daily fusion time series with 30 m resolution, which is then fused with the Sentinel-2 dataset to generate the final fusion product that contains daily time series with 10 m resolution.

Referring now in particular to FIGS. 13(a)-(o), these depict examples of STAIR 2.0 fusion results according to an embodiment. As seen in these FIGs. STAIR 2.0 was applied to produce the daily time-series with 10 m resolution that covers the growing season (from April 1 to October 30) of a test region in Saunders, NE in 2017. Shown are the input and fused images in June 2017 in these figures. FIGS. 13(a)-(c): MODIS images are available at everyday and three MODIS images on (a) June 1, (b) June 15, and (c) June 30 are shown in these figures. FIGS. 13(d)-(f): Three Landsat images are available, which are on (d) June 6, (e) June 14, and (f) June 30. FIGS. 13(g)-(i): Three Sentinel-2 images are available, which are on (g) June 2, (h) June 9, and (i) June 29. FIGS. 13(j)-(l): intermediate MODIS-Landsat fusion product (ML-fusion). MODIS and Landsat datasets are fused to generate a daily, 30 m fusion product. Three images on (j) June 1, (k) June 15, and (l) June 30 are shown in these figures. FIGs. (m)-(o): Final MODIS-Landsat-Sentinel-2 fusion product (MLS-fusion). The ML-fusion product is fused with the Sentinel-2 dataset to produce a daily, 10 m resolution fusion product. Three images on (m) June 1, (n) June 15, and (o) June 30 are shown in these figures. Missing-value pixels that are due to clouds or Landsat 7 un-scanned strips are shown as black pixels.

Referring now to FIG. 14, this depicts an illustrative embodiment of a method 1400 in accordance with various aspects described herein. As seen in this FIG. 14, step 1402 comprises partitioning, by a processing system including a processor, an image into a group of segments, wherein each segment of the group of segments includes pixels corresponding to one type of homogeneous pixels. Next, step 1404 comprises determining, by the processing system, a relative difference for each segment of the group of segments. Next, step 1406 comprises adaptively correcting, by the processing system, pixels in gaps, wherein the pixels are classified to each segment, wherein the correcting is according to the relative difference for each segment, and wherein the correcting results in an adaptively corrected image.

While for purposes of simplicity of explanation, the respective processes are shown and described as a series of blocks in FIG. 14, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 15:
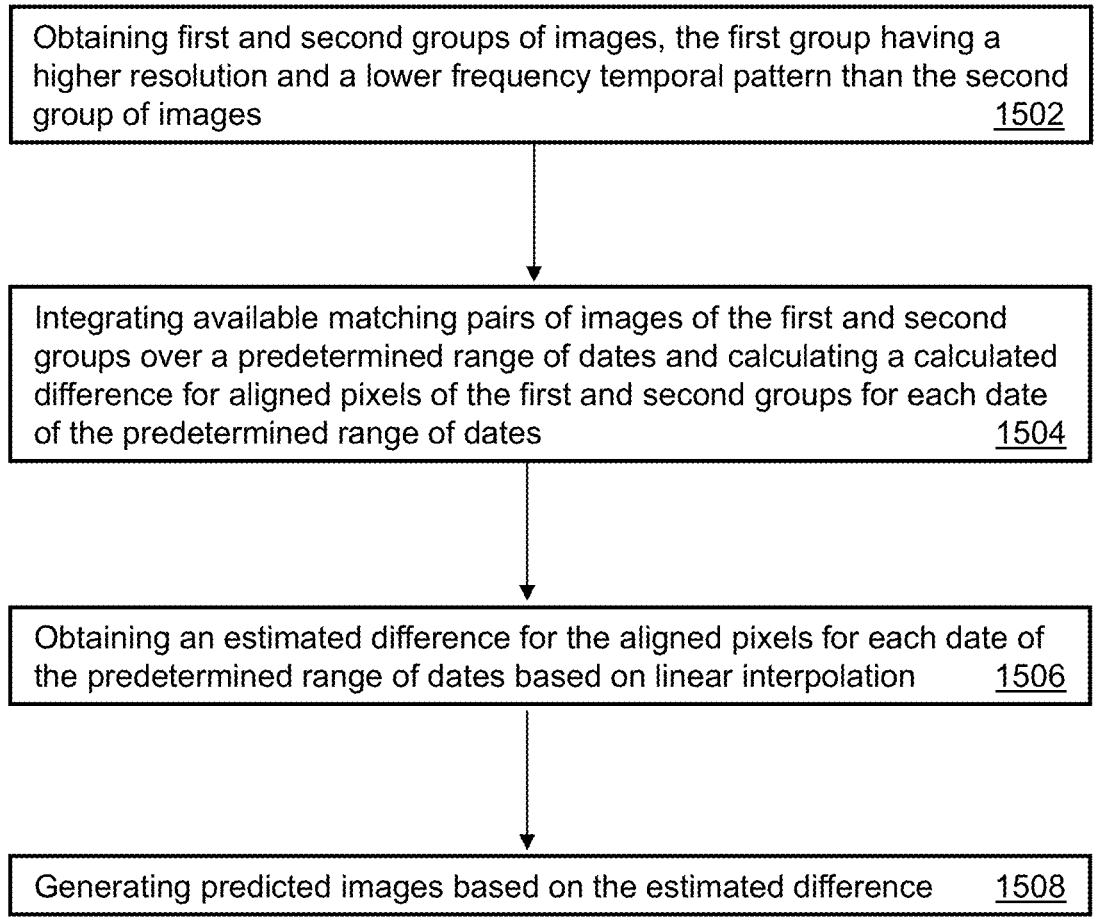
FIG. 15 depicts an illustrative embodiment of a method in accordance with various aspects described herein.

Referring now to FIG. 15, this depicts an illustrative embodiment of a method 1500 in accordance with various aspects described herein. As seen in this FIG. 15, step 1502 comprises obtaining first and second groups of images, the first group having a higher resolution and a lower frequency temporal pattern than the second group of images. Next, step 1504 comprises integrating available matching pairs of images of the first and second groups over a predetermined range of dates and calculating a calculated difference for aligned pixels of the first and second groups for each date of the predetermined range of dates. Next, step 1506 comprises obtaining an estimated difference for the aligned pixels for each date of the predetermined range of dates based on linear interpolation. Next, step 1508 comprises generating predicted images based on the estimated difference.

While for purposes of simplicity of explanation, the respective processes are shown and described as a series of blocks in FIG. 15, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 16:
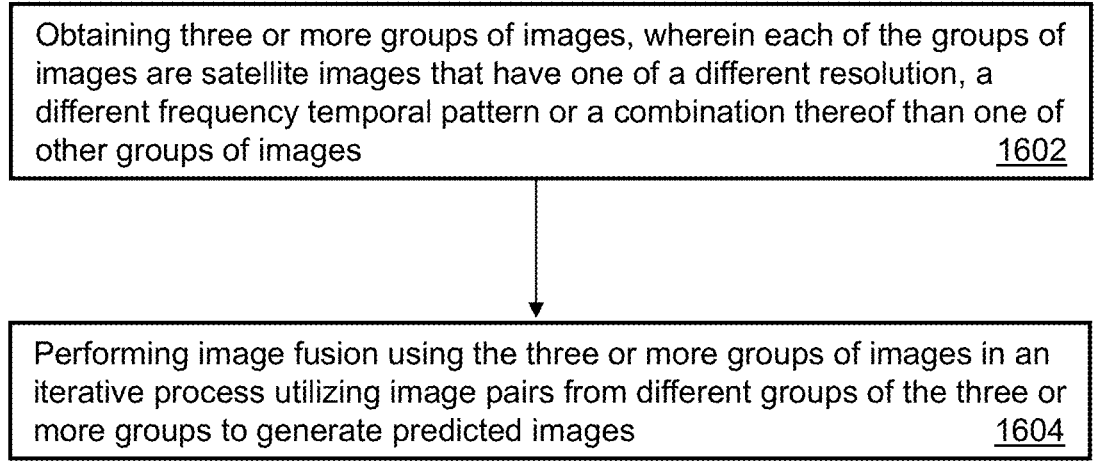
FIG. 16 depicts an illustrative embodiment of a method in accordance with various aspects described herein.

Referring now to FIG. 16, this depicts an illustrative embodiment of a method 1600 in accordance with various aspects described herein. As seen in this FIG. 16, step 1602 comprises obtaining three or more groups of images, wherein each of the groups of images are satellite images that have one of a different resolution, a different frequency temporal pattern or a combination thereof than one of other groups of images. Next, step 1604 comprises performing image fusion using the three or more groups of images in an iterative process utilizing image pairs from different groups of the three or more groups to generate predicted images.

While for purposes of simplicity of explanation, the respective processes are shown and described as a series of blocks in FIG. 16, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

As described herein the STAIR 2.0 embodiment provides a generic and automatic algorithm to fuse MODIS, Landsat, and Sentinel-2 to generate (for example) 10 m, daily, cloud-free and gap-free surface reflectance product.

From the foregoing descriptions, it would be evident to an artisan with ordinary skill in the art that the aforementioned embodiments can be modified, reduced, or enhanced without departing from the scope and spirit of the claims described below. For example, other image processing techniques can be utilized to improve resolution.

In one or more embodiments, a single combined image can be generated from two or more images where the generated image has gaps filled and has a better spatial resolution than the source images. In one or more embodiments, the fusion method can be applied to crop/ecosystem monitoring, yield forecasting, urban expansion monitoring, water resources management, as well as other situations.

In one or more embodiments, an algorithm can take a time series image data from two or more sources as input. In one or more embodiments, missing pixels can be filed by: linearly interpolating values using images from other dates, where the surface reflectance of the same region is not missing, to obtain a coarse estimation of the missing value; fitting a linear regression model to obtain a more robust estimation of the missing value if there are more than one image available within a short time frame; computing the relative difference between two communities of pixels in the gap-free image, and using this difference to correct the value derived by the linear regression model; and/or running a clustering algorithm to partition the image into multiple segments, where each segment contains the pixels corresponding to one crop type, and computing the relative difference for each segment.

In one or more embodiments, image data fusing algorithm can be performed by: taking a time series of images (with gaps filled) observed on matching time as input; integrating the available matching pairs on desired dates; calculating the accurate difference between the data for each time interval; interpolating the difference into each date to predict a fine resolution image and obtain an estimated difference for all positions and each date; and/or using more data to further correct the spatial information encoded in the estimated difference.

Other suitable modifications can be applied to the subject disclosure. Accordingly, the reader is directed to the claims for a fuller understanding of the breadth and scope of the subject disclosure.

Figure 17:
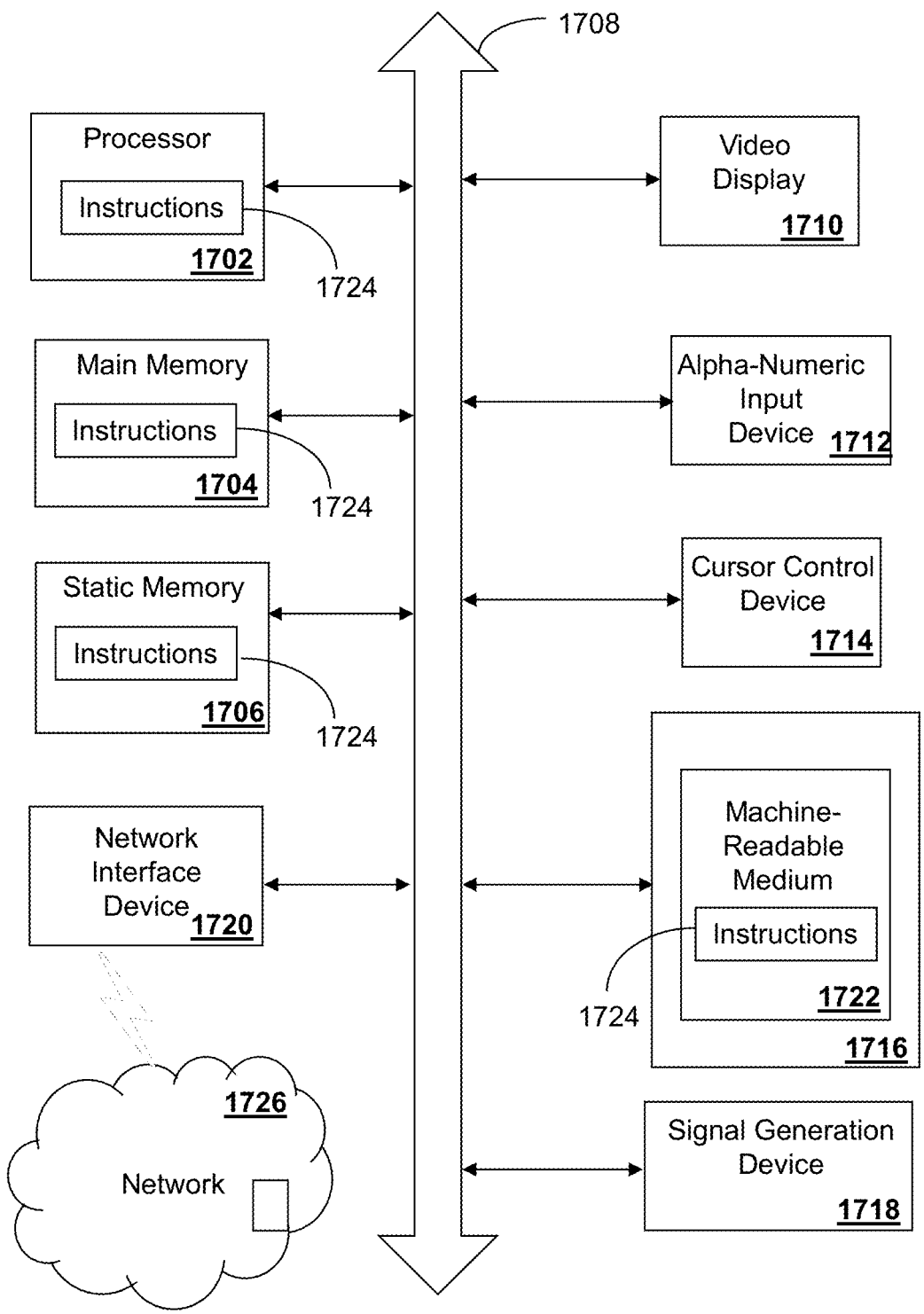
FIG. 17 depicts an illustrative diagrammatic representation of a machine in the form of a computer system within which a set of instructions, when executed, may cause the machine to perform any one or more of the methodologies disclosed herein.

FIG. 17 depicts an exemplary diagrammatic representation of a machine in the form of a computer system 1700 within which a set of instructions, when executed, may cause the machine to perform any one or more of the methods discussed above. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video, or data communication. Further, while a single machine is illustrated, the term "machine" shall also be taken to include any collection of machines that individually or jointly execute a set (or multiple sets) of instructions to perform any one or more of the methods discussed herein.

The computer system 1700 may include a processor 1702 (e.g., a central processing unit (CPU), a graphics processing unit (GPU, or both), a main memory 1704 and a static memory 1706, which communicate with each other via a bus 1708. The computer system 1700 may further include a video display unit 1710 (e.g., a liquid crystal display (LCD), a flat panel, or a solid state display. The computer system 1700 may include an input device 1712 (e.g., a keyboard), a cursor control device 1714 (e.g., a mouse), a disk drive unit 1716, a signal generation device 1718 (e.g., a speaker or remote control) and a network interface device 1720.

The disk drive unit 1716 may include a tangible computer-readable storage medium 1722 on which is stored one or more sets of instructions (e.g., software 1724) embodying any one or more of the methods or functions described herein, including those methods illustrated above. The instructions 1724 may also reside, completely or at least partially, within the main memory 1704, the static memory 1706, and/or within the processor 1702 during execution thereof by the computer system 1700. The main memory 1704 and the processor 1702 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 1722 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

List of Acronyms

BRDF: bidirectional reflectance distribution function.
ESA: European Space Agency
GOES: Geo-stationary Operational Environmental Satellite
JAXA: Japan Aerospace Exploration Agency
MODIS: Moderate Resolution Imaging Spectroradiometer
MSG: Meteosat Second Generation
NASA: National Aeronautics and Space Administration
NDVI: Normalized Difference Vegetation Index
NOAA: National Oceanic and Atmospheric Administration
STAIR: SaTellite dAta IntegRation (name of the presented method)
VIIRS: Visible Infrared Imaging Radiometer Suite

REFERENCES

Arvidson, T., Goward, S., Gasch, J., & Williams, D. (2006, October). Landsat-7 Long-Term Acquisition Plan. *Photogrammetric Engineering & Remote Sensing*, 72(10), 1137-1146. doi:10.14358/pers.72.10.1137

Bessho, K., Date, K., Hayashi, M., Ikeda, A., Imai, T., Inoue, H., . . . Yoshida, R. (2016). An Introduction to Himawari-8/9—Japan's New-Generation Geostationary Meteorological Satellites. *Journal of the Meteorological Society of Japan. Ser. II*, 94(2), 151-183. doi:10.2151/jmsj.2016-009

Cammalleri, C., Anderson, M., Gao, F., Hain, C., & Kustas, W. (2014, March). Mapping daily evapotranspiration at field scales over rainfed and irrigated agricultural areas using remote sensing data fusion. *Agricultural and Forest Meteorology*, 186, 1-11. doi:10.1016/j.agrformet.2013.11.001

Cao, C., Xiong, J., Blonski, S., Liu, Q., Uprety, S., Shao, X., . . . Weng, F. (2013, October). Suomi NPP VIIRS sensor data record verification, validation, and long-term performance monitoring. *Journal of Geophysical Research: Atmospheres,* 118(20). doi:10.1002/2013jd020418

Chen, J., Zhu, X., Vogelmann, J. E., Gao, F., & Jin, S. (2011). A simple and effective method for filling gaps in Landsat ETM+ SLC-off images. *Remote Sensing of Environment,* 115(4), 1053-1064.

Claverie, M., Vermote, E. F., Franch, B., & Masek, J. G. (2015, November). Evaluation of the Landsat-5 TM and Landsat-7 ETM surface reflectance products. *Remote Sensing of Environment,* 169, 390-403. doi:10.1016/j.rse.2015.08.030

Denis, G., Claverie, A., Pasco, X., Darnis, J., Maupeou, B. D., Lafaye, M., & Morel, E. (2017, August). Towards disruptions in Earth observation? New Earth Observation systems and markets evolution: Possible scenarios and impacts. *Acta Astronautica,* 137, 415-433. doi: 10.1016/j.actaastro.2017.04.034

Dierckx, W., Sterckx, S., Benhadj, I., Livens, S., Duhoux, G., Achteren, T. V., . . . Saint, G. (2014, March). PROBA-V mission for global vegetation monitoring: Standard products and image quality. *International Journal of Remote Sensing,* 35(7), 2589-2614. doi:10.1080/01431161.2014.883097

Drusch, M., Bello, U. D., Cartier, S., Colin, O., Fernandez, V., Gascon, F., . . . Bargellini, P. (2012, May). Sentinel-2: ESA's Optical High-Resolution Mission for GMES Operational Services. *Remote Sensing of Environment,* 120, 25-36. doi:10.1016/j.rse.2011.11.026

Flood, N. (2014, August). Continuity of Reflectance Data between Landsat-7 ETM and Landsat-8 OLI, for Both Top-of-Atmosphere and Surface Reflectance: A Study in the Australian Landscape. *Remote Sensing,* 6(9), 7952-7970. doi:10.3390/rs6097952

Gao, F., Hilker, T., Zhu, X., Anderson, M., Masek, J., Wang, P., & Yang, Y. (2015, September). Fusing Landsat and MODIS Data for Vegetation Monitoring. *IEEE Geoscience and Remote Sensing Magazine,* 3(3), 47-60. doi: 10.1109/mgrs.2015.2434351

Gao, F., Masek, J., Schwaller, M., & Hall, F. (2006, August). On the blending of the Landsat and MODIS surface reflectance: Predicting daily Landsat surface reflectance. *IEEE Transactions on Geoscience and Remote Sensing,* 44(8), 2207-2218. doi:10.1109/tgrs.2006.872081

Gao, F., Anderson, M. C., Zhang, X., Yang, Z., Alfieri, J. G., Kustas, W. P., . . . Prueger, J. H. (2017, January). Toward mapping crop progress at field scales through fusion of Landsat and MODIS imagery. *Remote Sensing of Environment,* 188, 9-25. doi:10.1016/j.rse.2016.11.004

Gaulton, R., Hilker, T., Wulder, M. A., Coops, N. C., & Stenhouse, G. (2011, February). Characterizing stand-replacing disturbance in western Alberta grizzly bear habitat, using a satellite-derived high temporal and spatial resolution change sequence. *Forest Ecology and Management,* 261(4), 865-877. doi:10.1016/j.foreco.2010.12.020

Hansen, M. C., Potapov, P. V., Moore, R., Hancher, M., Turubanova, S. A., Tyukavina, A., . . . Townshend, J. R. (2013, November). High-Resolution Global Maps of 21st-Century Forest Cover Change. *Science,* 342(6160), 850-853. doi:10.1126/science.1244693

Henson, R. (2008). Satellite observations to benefit science and society: Recommended missions for the next decade. National Academies Press.

Hilker, T., Wulder, M. A., Coops, N. C., Linke, J., McDermid, G., Masek, J. G., . . . & White, J. C. (2009). A new data fusion model for high spatial- and temporal-resolution mapping of forest disturbance based on Landsat and MODIS. *Remote Sensing of Environment,* 113(8), 1613-1627.

Hossain, F. (2015, October). Data for All: Using Satellite Observations for Social Good. *Eos,* 96. doi:10.1029/2015eo037319

Imhoff, M. L., Zhang, P., Wolfe, R. E., & Bounoua, L. (2010, March). Remote sensing of the urban heat island effect across biomes in the continental USA. *Remote Sensing of Environment,* 114(3), 504-513. doi:10.1016/j.rse.2009.10.008

Jean, N., Burke, M., Xie, M., Davis, W. M., Lobell, D. B., & Ermon, S. (2016, August). Combining satellite imagery and machine learning to predict poverty. *Science,* 353 (6301), 790-794. doi:10.1126/science.aaf7894

Ju, J., & Roy, D. P. (2008, March). The availability of cloud-free Landsat ETM data over the conterminous United States and globally. *Remote Sensing of Environment,* 112(3), 1196-1211. doi:10.1016/j.rse.2007.08.011

Li, P., Jiang, L., & Feng, Z. (2013, December). Cross-Comparison of Vegetation Indices Derived from Landsat-7 Enhanced Thematic Mapper Plus (ETM) and Landsat-8 Operational Land Imager (OLI) Sensors. *Remote Sensing,* 6(1), 310-329. doi:10.3390/rs6010310

Loveland, T. R., & Dwyer, J. L. (2012, July). Landsat: Building a strong future. *Remote Sensing of Environment,* 122, 22-29. doi:10.1016/j.rse.2011.09.022

Masek, J., Vermote, E., Saleous, N., Wolfe, R., Hall, F., Huemmrich, K., . . . Lim, T. (2006, January). A Landsat Surface Reflectance Dataset for North America, 1990-2000. *IEEE Geoscience and Remote Sensing Letters,* 3(1), 68-72. doi:10.1109/lgrs.2005.857030

Mulla, D. J. (2013, April). Twenty five years of remote sensing in precision agriculture: Key advances and remaining knowledge gaps. *Biosystems Engineering,* 114 (4), 358-371. doi: 10.1016/j.biosystemseng.2012.08.009

Otsu, N. (1979, January). A Threshold Selection Method from Gray-Level Histograms. *IEEE Transactions on Systems, Man, and Cybernetics,* 9(1), 62-66. doi:10.1109/tsmc.1979.4310076

Portmann, F. T., Siebert, S., & Doll, P. (2010, March). MIRCA2000-Global monthly irrigated and rainfed crop areas around the year 2000: A new high-resolution data set for agricultural and hydrological modeling. *Global Biogeochemical Cycles,* 24(1). doi:10.1029/2008gb003435

Roy, D. P., M. A. Wulder, T. R. Loveland, W. C. E., R. G. Allen, M. C. Anderson, D. Helder, J. R. Irons, D. M. Johnson, R. Kennedy, T. A. Scambos, C. B. Schaaf, J. R. Schott, Y. Sheng, E. F. Vermote, A. S. Belward, R. Bindschadler, W. B. Cohen, F. Gao, J. D. Hipple, P. Hostert, J. Huntington, C. O. Justice, A. Kilic, V. Kovalskyy, Z. P. Lee, L. Lymburner, J. G. Masek, J. McCorkel, Y. Shuai, R. Trezza, J. Vogelmann, R. H. Wynne, and Z. Zhu. 2014. Landsat-8: Science and product vision for terrestrial global change research. Remote Sens. Environ. 145: 154-172.

Roy, D., Zhang, H., Ju, J., Gomez-Dans, J., Lewis, P., Schaaf, C., . . . Kovalskyy, V. (2016, April). A general method to normalize Landsat reflectance data to nadir BRDF adjusted reflectance. *Remote Sensing of Environment,* 176, 255-271. doi:10.1016/j.rse.2016.01.023

Schmetz, J., Pili, P., Tjemkes, S., Just, D., Kerkmann, J., Rota, S., & Ratier, A. (2002, July). Supplement to An Introduction to Meteosat Second Generation (MSG). *Bul-* letin of the American Meteorological Society, 83(7), 991-991. doi:10.1175/bams-83-7-schmetz-1

Schmit, T. J., Gunshor, M. M., Menzel, W. P., Gurka, J. J., Li, J., & Bachmeier, A. S. (2005, August). Introducing The Next-Generation Advanced Baseline Imager On Goes-R. *Bulletin of the American Meteorological Society*, 86(8), 1079-1096. doi:10.1175/bams-86-8-1079

Stone, B., & Rodgers, M. O. (2001, June). Urban Form and Thermal Efficiency: How the Design of Cities Influences the Urban Heat Island Effect. *Journal of the American Planning Association*, 67(2), 186-198. doi: 10.1080/01944360108976228

Storey, J. 2016. In Proceedings of the Landsat Science Team Meeting, Virginia Tech, Blacksburg, VA, USA.

Schaaf, C. B., F. Gao, A. H. Strahler, W. Lucht, X. Li, T. Tsang, N. C. Strugnell, X. Zhang, Y. Jin, J. Muller, P. Lewis, M. Barnsley, P. Hobson, M. Disney, G. Roberts, M. Dunderdale, C. Doll, P. Robert, B. Hu, S. Liang, J. L. Privette, and D. Roy. 2002. First operational BRDF, albedo nadir reflectance products from MODIS. Remote Sens. Environ. 83: 135-148.

Strahler, A. H., Muller, J. P., Lucht, W., Schaaf, C., Tsang, T., Gao, F., . . . & Barnsley, M. J. (1999). MODIS BRDF/albedo product: algorithm theoretical basis document version 5.0. MODIS documentation, 23(4), 42-47.

Wang, Z., C. B. Schaaf, A. H. Strahler, M. J. Chopping, M. O. Román, Y. Shuai, C. E. Woodcock, D. Y. Hollinger, and D. R. Fitzjarrald. 2014. Evaluation of MODIS albedo product (MCD43A) over grassland, agriculture and forest surface types during dormant and snow-covered periods. Remote Sens. Environ. 140: 60-77.

Yan, L., Roy, D., Zhang, H., Li, J., & Huang, H. (2016, June). An Automated Approach for Sub-Pixel Registration of Landsat-8 Operational Land Imager (OLI) and Sentinel-2 Multi Spectral Instrument (MSI) Imagery. *Remote Sensing*, 8(6), 520. doi:10.3390/rs8060520

Zhu, X., Chen, J., Gao, F., Chen, X., & Masek, J. G. (2010, November). An enhanced spatial and temporal adaptive reflectance fusion model for complex heterogeneous regions. *Remote Sensing of Environment*, 114(11), 2610-2623. doi:10.1016/j.rse.2010.05.032

Zhu, X., Liu, D., & Chen, J. (2012). A new geostatistical approach for filling gaps in Landsat ETM+ SLC-off images. *Remote sensing of Environment*, 124, 49-60.

Zhu, Z., & Woodcock, C. E. (2012, March). Object-based cloud and cloud shadow detection in Landsat imagery. *Remote Sensing of Environment*, 118, 83-94. doi:10.1016/j.rse.2011.10.028.

Claverie, M., Ju, J., Masek, J. G., Dungan, J. L., Vermote, E. F., Roger, J. C., . . . & Justice, C. (2018). The Harmonized Landsat and Sentinel-2 surface reflectance data set. *Remote Sensing of Environment*, 219, 145-161.

Gao, F., Masek, J., Schwaller, M., & Hall, F. (2006, August). On the blending of the Landsat and MODIS surface reflectance: Predicting daily Landsat surface reflectance. *IEEE Transactions on Geoscience and Remote Sensing*, 44(8), 2207-2218. doi:10.1109/tgrs.2006.872081.

Lloyd, S. (1982). Least squares quantization in PCM. *IEEE transactions on information theory*, 28(2), 129-137.

Louis, J., Debaecker, V., Pflug, B., Main-Korn, M., Bieniarz, J., Mueller-Wilm, U., . . . & Gascon, F. (2016, August). Sentinel-2 Sen2Cor: L2A Processor for Users. In *Living Planet Symposium* (Vol. 740, p. 91).

Lowe, D. "Object Recognition from Local Scale-Invariant Features." *Proceedings of the Seventh IEEE International Conference on Computer Vision*, 1999, doi:10.1109/iccv.1999.790410.

Luo, Y., Guan, K., & Peng, J. (2018). STAIR: A generic and fully-automated method to fuse multiple sources of optical satellite data to generate a high-resolution, daily and cloud-/gap-free surface reflectance product. *Remote Sensing of Environment*, 214, 87-99.

Masek, J., Vermote, E., Saleous, N., Wolfe, R., Hall, F., Huemmrich, K., . . . Lim, T. (2006, January). A Landsat Surface Reflectance Dataset for North America, 1990-2000. *IEEE Geoscience and Remote Sensing Letters*, 3(1), 68-72. doi:10.1109/lgrs.2005.857030.

Roy, D. P., Kovalskyy, V., Zhang, H. K., Vermote, E. F., Yan, L., Kumar, S. S., & Egorov, A. (2016). Characterization of Landsat-7 to Landsat-8 reflective wavelength and normalized difference vegetation index continuity. *Remote Sensing of Environment*, 185, 57-70.

Roy, D. P., M. A. Wulder, T. R. Loveland, W. C. E., R. G. Allen, M. C. Anderson, D. Helder, J. R. Irons, D. M. Johnson, R. Kennedy, T. A. Scambos, C. B. Schaaf, J. R. Schott, Y. Sheng, E. F. Vermote, A. S. Belward, R. Bindschadler, W. B. Cohen, F. Gao, J. D. Hipple, P. Hostert, J. Huntington, C. O. Justice, A. Kilic, V. Kovalskyy, Z. P. Lee, L. Lymburner, J. G. Masek, J. McCorkel, Y. Shuai, R. Trezza, J. Vogelmann, R. H. Wynne, and Z. Zhu. 2014. Landsat-8: Science and product vision for terrestrial global change research. Remote Sens. Environ. 145: 154-172.

Schaaf, C. B., F. Gao, A. H. Strahler, W. Lucht, X. Li, T. Tsang, N. C. Strugnell, X. Zhang, Y. Jin, J. Muller, P. Lewis, M. Barnsley, P. Hobson, M. Disney, G. Roberts, M. Dunderdale, C. Doll, P. Robert, B. Hu, S. Liang, J. L. Privette, and D. Roy. 2002. First operational BRDF, albedo nadir reflectance products from MODIS. *Remote Sens. Environ.* 83: 135-148.

Strahler, A. H., Muller, J. P., Lucht, W., Schaaf, C., Tsang, T., Gao, F., . . . & Barnsley, M. J. (1999). MODIS BRDF/albedo product: algorithm theoretical basis document version 5.0. *MODIS documentation*, 23(4), 42-47.

Tjbshirani, R., Walther, G., & Hastie, T. (2001). Estimating the number of clusters in a data set via the gap statistic. *Journal of the Royal Statistical Society: Series B (Statistical Methodology)*, 63(2), 411-423.

Wang, Z., C. B. Schaaf, A. H. Strahler, M. J. Chopping, M. O. Román, Y. Shuai, C. E. Woodcock, D. Y. Hollinger, and D. R. Fitzjarrald. 2014. Evaluation of MODIS albedo product (MCD43A) over grassland, agriculture and forest surface types during dormant and snow-covered periods. *Remote Sens. Environ.* 140: 60-77.

Zhu, X., Chen, J., Gao, F., Chen, X., & Masek, J. G. (2010, November). An enhanced spatial and temporal adaptive reflectance fusion model for complex heterogeneous regions. *Remote Sensing of Environment*, 114(11), 2610-2623. doi:10.1016/j.rse.2010.05.032

Zhu, Z., & Woodcock, C. E. (2012, March). Object-based cloud and cloud shadow detection in Landsat imagery. *Remote Sensing of Environment*, 118, 83-94. doi:10.1016/j.rse.2011.10.028.

The invention claimed is:

1. A method comprising:
   obtaining two or more groups of remote sensing images comprising pixels, wherein values of the pixels represent one or more variables describing the state of the plant cover, and wherein geographical regions covered by the images from each group overlaps at least partially with a region covered by a first group of images;
   selecting pairs of the remote sensing images from (i) the first group, and (ii) from any other group captured on a set of time points when the images or partial images acquired from both groups of remote sensing images are available within a certain tolerated time difference;

calculating, for any location within the overlapped geographical region, at any time when the images from both groups are available within the tolerated time difference, the difference between values of pixels of the selected pair of images;

obtaining an estimation, based on the previously calculated differences of values of pixels of the selected pair of images, of a difference between values of pixels of at least two images in the two or more groups of remote sensing images on a set of times when no image is available from one or both of the groups of remote sensing images within a certain tolerated time difference; and generating a predicted image wherein values of pixels thereof are computed by adding the estimated difference to values of pixels from at least one group of remote sensing images.

2. The method of claim 1, wherein the one or more variables describing the state of the plant cover include surface reflectance.

3. The method of claim 1, wherein the one or more variables describing the state of the plant cover include a vegetation index.

4. The method of claim 1, wherein the one or more variables describing the state of the plant cover include radiance.

5. The method of claim 1, wherein at least one of the one or more variables describing the state of the plant cover is derived from optical remote sensing data.

6. The method of claim 1, wherein any of the groups of remote sensing images comprises estimates of a remotely sensed value, or values derived from such, based on observation taken on close dates by one or more satellite or airborne sensors.

7. The method of claim 1, wherein any of the groups of remote sensing images are satellite images from LANDSAT, MODIS, Sentinel-2, or other data sources.

8. The method of claim 1, wherein the groups of remote sensing images comprise different spatial resolution or temporal frequency.

9. The method of claim 1, wherein unavailability of part of the entirety of the image is caused by cloud cover, cloud shadow, sensor malfunction, or the lack of satellite flyover.

10. A non-transitory, computer readable medium comprising executable instructions that, when executed by a processing system including a processor, facilitate performance of operations, the operations comprising:

obtaining three or more groups of images, wherein each of the groups of images are satellite images and the three or more groups of images are obtained via at least three different types of satellite imaging sensors; and performing image fusion using the three or more groups of images in an iterative process utilizing image pairs from different groups of the three or more groups to generate predicted images;

partitioning an image of one of the three or more groups of images into a group of segments, wherein each segment of the group of segments includes pixels corresponding to one type of homogeneous pixels;

determining a relative difference for each segment of the group of segments; and adaptively correcting pixels in gaps, wherein the pixels are classified to each segment, wherein the correcting is according to the relative difference for each segment, and wherein the correcting results in an adaptively corrected image;

wherein a number of the group of segments is automatically chosen by the processing system according to a clustering technique without a user selecting the number of the group of segments, and wherein a first type of the homogeneous pixels corresponds to corn and a second type of the homogeneous pixels corresponds to soybean.

* * * * *